US012707022B2

(12) United States Patent
Chen et al.

(10) Patent No.: US 12,707,022 B2
(45) Date of Patent: Aug. 11, 2026

(54) CO-PHOTOGRAPHING METHOD AND ELECTRONIC DEVICE

(71) Applicant: HUAWEI TECHNOLOGIES CO., LTD., Shenzhen (CN)

(72) Inventors: Lanhao Chen, Shenzhen (CN); Shikun Xu, Shenzhen (CN); Fei Yu, Shenzhen (CN); Qingji Meng, Shenzhen (CN); Zhongling Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 279 days.

(21) Appl. No.: 18/264,875

(22) PCT Filed: Jan. 17, 2022

(86) PCT No.: PCT/CN2022/072235
§ 371 (c)(1),
(2) Date: Aug. 9, 2023

(87) PCT Pub. No.: WO2022/170918
PCT Pub. Date: Aug. 18, 2022

(65) Prior Publication Data
US 2024/0056677 A1 Feb. 15, 2024

(30) Foreign Application Priority Data
Feb. 9, 2021 (CN) ......................... 202110181051.9
May 14, 2021 (CN) ......................... 202110528138.9

(51) Int. Cl.
*H04N 23/63* (2023.01)
*H04N 5/262* (2006.01)

(52) U.S. Cl.
CPC ......... *H04N 23/632* (2023.01); *H04N 5/2624* (2013.01)

(58) Field of Classification Search
CPC .... H04N 23/632; H04N 5/2624; H04N 7/147; G06T 2200/24; G06T 11/60
See application file for complete search history.

(56) References Cited

U.S. PATENT DOCUMENTS 11,539,919 B1 * 12/2022 Rao .................. H04N 21/44016
2005/0060751 A1 * 3/2005 Glaser .................... H04L 12/281 348/E7.071
2010/0158379 A1 * 6/2010 Hatfield .................. G06T 7/194 382/190
(Continued)

FOREIGN PATENT DOCUMENTS

CN 110944109 A 3/2020
CN 111629151 A 9/2020
(Continued)

*Primary Examiner* — Duc Nguyen
*Assistant Examiner* — Saad Ahmed Syed

(57) ABSTRACT

An electronic device and methods are provided for co-photographing. In the course of a video call, video content associated with two users can be obtained, and a co-photographing image or a co-photographing video of the content of the two users can be further obtained. During the video call, the two users can exchange co-photographing details. After the video call ends, the co-photographing video can be quickly generated. User experience can be improved by reducing post-processing activity and improving definition of synthesized imagery or synthesized video.

16 Claims, 29 Drawing Sheets

(56) References Cited

U.S. PATENT DOCUMENTS

| | | | | |
|---|---|---|---|---|
| 2014/0022332 | A1* | 1/2014 | Wang | H04M 3/567<br>348/14.07 |
| 2015/0081806 | A1* | 3/2015 | Kanuturi | G06Q 10/1093<br>709/206 |
| 2022/0210207 | A1* | 6/2022 | Martin | H04L 65/1093 |

FOREIGN PATENT DOCUMENTS

| | | | | | |
|---|---|---|---|---|---|
| CN | 111866434 | A | | 10/2020 | |
| CN | 112004034 | A | * | 11/2020 | H04N 5/272 |
| WO | WO-2020131177 | A1 | * | 6/2020 | G06V 40/161 |

* cited by examiner

1500

FIG. 17
5G
5G
8:00
Tom
+86 12312341234
Calling...
Switch
Decline
More

1600

FIG. 18
5G 5G
8:00
Tom
+86 12312341234
Request to initiate co-photographing...
Switch
Decline
More

1700

CO-PHOTOGRAPHING METHOD AND ELECTRONIC DEVICE

This application is a National Stage of International Application No. PCT/CN2022/072235 filed on Jan. 17, 2022, which claims priority to Chinese Patent Application No. 202110181051.9 filed on Feb. 9, 2021 and Chinese Patent Application No. 202110528138.9, filed on May 14, 2021. All of the aforementioned patent applications are hereby incorporated by reference in their entireties.

TECHNICAL FIELD

This application relates to the field of electronic devices, and more specifically, to a co-photographing method and an electronic device.

BACKGROUND

A plurality of users located in a same site may perform co-photographing through a same camera device (an electronic device with a camera), to obtain a picture or a video that includes appearances of the plurality of users. However, it is often difficult to achieve a high-quality co-photographing effect for remote multi-user co-photographing. Possible causes thereof include, for example, the need for additional post-processing, and poor definition of a synthesized picture or a synthesized video.

SUMMARY

This application provides a co-photographing method and an electronic device, and objectives of this application include reducing a post-processing amount, improving definition of a synthesized picture or a synthesized video, and the like, to help improve user experience of co-photographing of a plurality of users in different places.

According to a first aspect, a co-photographing method is provided, and includes the following steps:

A first electronic device establishes a video call connection between the first electronic device and a second electronic device, where the first electronic device is an electronic device of a first user, and the second electronic device is an electronic device of a second user.

The first electronic device obtains first video data of the first user in a video call process.

The first electronic device obtains second video data of the second user from the second electronic device through the video call connection.

The first electronic device obtains a co-photographing file of the first user and the second user based on the first video data and the second video data.

Through the video call, synchronous remote co-photographing can be implemented. A plurality of users can discuss and communicate with each other, to help improve a matching degree of co-photographing of the plurality of users. After the video call is hung up, a co-photographing picture or a co-photographing video with a good co-photographing effect can be obtained, to help reduce a workload of the user in a co-photographing process, for example, a workload of post-retouching.

With reference to the first aspect, in some implementations of the first aspect, before the first electronic device establishes the video call connection between the first electronic device and the second electronic device, the co-photographing method further includes the following steps:

The first electronic device displays a first interface of a photographing application, where the first interface includes a co-photographing control.

The first electronic device displays a second interface in response to an operation performed on the co-photographing control, where the second interface includes a plurality of user controls that are in a one-to-one correspondence with a plurality of users, and the plurality of users include the second user.

The first electronic device sends a co-photographing invitation to the second electronic device in response to an operation performed on a user control of the second user, to establish the video call connection.

The co-photographing control may be built in the photographing application, and the co-photographing control may invoke a user control from an application other than the photographing application, to initiate a co-photographing request to another user. In addition, a plurality of applications (including the photographing application) of the electronic device may cooperatively run by using the co-photographing control, to implement co-photographing of the plurality of users. With reference to the first aspect, in some implementations of the first aspect, before the first electronic device establishes the video call connection between the first electronic device and the second electronic device, the co-photographing method further includes the following steps:

The first electronic device displays a third interface of a video call application, where the third interface includes a plurality of video call controls that are in a one-to-one correspondence with a plurality of users, and the plurality of users include the second user.

The first electronic device sends a video call invitation to the second electronic device in response to an operation performed on a video call control of the second user, to establish the video call connection.

The video call application may run in collaboration with another application, to implement co-photographing of the plurality of users. Therefore, in addition to a video call function, the video call application may have a function of generating the co-photographing file.

With reference to the first aspect, in some implementations of the first aspect, the co-photographing method further includes the following step:

The first electronic device displays a first interface region and a second interface region in a fourth interface based on the first video data and the second video data, where the first interface region includes a first user image, the second interface region includes a second user image, the first user image includes pixels corresponding to the first user, and the second user image includes pixels corresponding to the second user.

Before obtaining the co-photographing file, the first electronic device displays images of the plurality of users, so that a general effect of co-photographing of the plurality of users can be previewed, and the user can extract and predict a general situation of the co-photographing file. This helps make a co-photographing video more easily meet an expectation of the user.

With reference to the first aspect, in some implementations of the first aspect, the fourth interface includes a split screen on/off control and a background removal on/off control, and when the split screen on/off control is on and the background removal on/off control is on, the first interface region further includes a second background image or a target gallery image; and/or the second interface region further includes a first background image or a target gallery image, where the first background image includes pixels corresponding to a scene in which the first user is shown, and the second background image includes pixels corresponding to a scene in which the second user is shown.

That the background removal on/off control is on means that a background of at least one of the first interface region and the second interface region is removed, so that a same background can be used in the first interface region and the second interface region. This enables an image of the first user and an image of the second user to be considered to be in a same background or in a same scene. That the split screen on/off control is on means that the image of the first user and the image of the second user may belong to different regions in a user interface. This is more suitable for a scene in which user images need to be distinguished in a distinct manner, for example, a scene in which images of a plurality of users are not suitable for mixing due to different user identities.

With reference to the first aspect, in some implementations of the first aspect, the fourth interface includes a split screen on/off control and a background removal on/off control, and when the split screen on/off control is off and the background removal on/off control is on, the fourth interface includes a background interface region, the background interface region is backgrounds of the first interface region and the second interface region, and the background interface region includes any one of the following: a first background image, a second background image, and a target gallery image, where the first background image includes pixels corresponding to a scene in which the first user is shown, and the second background image includes pixels corresponding to a scene in which the second user is shown.

That the background removal on/off control is on means that a background of at least one of the first interface region and the second interface region is removed, so that a same background can be used in the first interface region and the second interface region. This enables an image of the first user and an image of the second user to be considered to be in a same background or in a same scene. That the split screen on/off control is off means that the image of the first user and the image of the second user may cross and cover each other. This helps further fuse the image of the first user and the image of the second user. This is more suitable for a scene in which user images do not need to be distinguished in a distinct manner, for example, a group co-photographing scene.

With reference to the first aspect, in some implementations of the first aspect, the co-photographing method further includes the following step:

The first electronic device adjusts a size of the first interface region and/or a size of the second interface region in response to an operation performed on the fourth interface.

Before obtaining the co-photographing file, the user may adjust proportions of the image of the first user and the image of the second user in a display interface, to indirectly adjust a co-photographing effect of the co-photographing file.

With reference to the first aspect, in some implementations of the first aspect, the co-photographing method further includes the following step:

The first electronic device adjusts a display priority of the first interface region or the second interface region in response to an operation performed on the fourth interface.

When the first interface region and the second interface region cross each other, the user may set a display priority to cover the second interface region with the first interface region, or cover the first interface region with the second interface region, so as to indirectly adjust a co-photographing effect of the co-photographing file.

With reference to the first aspect, in some implementations of the first aspect, the fourth interface further includes a recording control, and the obtaining a co-photographing file of the first user and the second user based on the first video data and the second video data includes the following step:

The first electronic device obtains the co-photographing file based on the first video data and the second video data in response to an operation performed on the recording control.

The recording control may indicate a moment at which co-photographing starts. In this way, in a video call process, the first electronic device may not need to always generate the co-photographing file from the start of the video call to the end of the video call.

With reference to the first aspect, in some implementations of the first aspect, the co-photographing file includes a first image region and a second image region, the first image region includes the pixels corresponding to the first user, and the second image region includes the pixels corresponding to the second user.

The co-photographing file may include images of a plurality of users, to implement co-photographing of the plurality of users.

With reference to the first aspect, in some implementations of the first aspect, the first image region includes pixels corresponding to any one of a first background image, a second background image, and a target library image.

A plurality of background images may be selected for the first image region, so that a background of the first user can be flexibly selected.

With reference to the first aspect, in some implementations of the first aspect, the second image region includes pixels corresponding to any one of the first background image, the second background image, and the target library image.

A plurality of background images may be selected for the second image region, so that a background of the second user can be flexibly selected.

With reference to the first aspect, in some implementations of the first aspect, the co-photographing file further includes a background image region, the background image region is backgrounds of the first image region and the second image region, and the background image region includes pixels corresponding to any one of the first background image, the second background image, and the target gallery image.

The background image region may be used as a common background of a plurality of users, so that the plurality of users can be considered to be in a same scene in the co-photographing file. A plurality of background images may be selected for the background image region, so that a background for multi-user co-photographing can be flexibly selected.

With reference to the first aspect, in some implementations of the first aspect, resolution of the co-photographing file is higher than display resolution of the first electronic device.

When call quality is good (for example, when a signal of an electronic device is good), definition of a co-photographing image or a co-photographing video may be high. This helps improve quality of the co-photographing file.

With reference to the first aspect, in some implementations of the first aspect, the co-photographing file is a co-photographing image or a co-photographing video.

According to a second aspect, an electronic device is provided, and includes:

a processor, a memory, and a transceiver, where the memory is configured to store a computer program, and the processor is configured to execute the computer program stored in the memory, where the processor is configured to establish a video call connection between the electronic device and a second electronic device, where the electronic device is an electronic device of a first user, and the second electronic device is an electronic device of a second user;

the processor is further configured to obtain first video data of the first user in a video call process;

the transceiver is configured to obtain second video data of the second user from the second electronic device through the video call connection; and the processor is further configured to obtain a co-photographing file of the first user and the second user based on the first video data and the second video data.

With reference to the second aspect, in some implementations of the second aspect, before the processor establishes the video call connection between the electronic device and the second electronic device, the processor is further configured to:

display a first interface of a photographing application, where the first interface includes a co-photographing control;

display a second interface in response to an operation performed on the co-photographing control, where the second interface includes a plurality of user controls that are in a one-to-one correspondence with a plurality of users, and the plurality of users include the second user; and send a co-photographing invitation to the second electronic device in response to an operation performed on a user control of the second user, to establish the video call connection.

With reference to the second aspect, in some implementations of the second aspect, before the processor establishes the video call connection between the electronic device and the second electronic device, the processor is further configured to:

display a third interface of a video call application, where the third interface includes a plurality of video call controls that are in a one-to-one correspondence with a plurality of users, and the plurality of users include the second user; and send a video call invitation to the second electronic device in response to an operation performed on a video call control of the second user, to establish the video call connection.

With reference to the second aspect, in some implementations of the second aspect, the processor is further configured to:

display a first interface region and a second interface region in a fourth interface based on the first video data and the second video data, where the first interface region includes a first user image, the second interface region includes a second user image, the first user image includes pixels corresponding to the first user, and the second user image includes pixels corresponding to the second user.

With reference to the second aspect, in some implementations of the second aspect, the fourth interface includes a split screen on/off control and a background removal on/off control, and when the split screen on/off control is on and the background removal on/off control is on, the first interface region further includes a second background image or a target gallery image; and/or the second interface region further includes a first background image or a target gallery image, where the first background image includes pixels corresponding to a scene in which the first user is shown, and the second background image includes pixels corresponding to a scene in which the second user is shown.

With reference to the second aspect, in some implementations of the second aspect, the fourth interface includes a split screen on/off control and a background removal on/off control, and when the split screen on/off control is off and the background removal on/off control is on, the fourth interface includes a background interface region, the background interface region is backgrounds of the first interface region and the second interface region, and the background interface region includes any one of the following: a first background image, a second background image, and a target gallery image, where the first background image includes pixels corresponding to a scene in which the first user is shown, and the second background image includes pixels corresponding to a scene in which the second user is shown.

With reference to the second aspect, in some implementations of the second aspect, the processor is further configured to:

adjust a size of the first interface region and/or a size of the second interface region in response to an operation performed on the fourth interface.

With reference to the second aspect, in some implementations of the second aspect, the processor is further configured to:

adjust a display priority of the first interface region or the second interface region in response to an operation performed on the fourth interface.

With reference to the second aspect, in some implementations of the second aspect, the fourth interface further includes a recording control, and the processor is specifically configured to:

obtain the co-photographing file based on the first video data and the second video data in response to an operation performed on the recording control.

With reference to the second aspect, in some implementations of the second aspect, the co-photographing file includes a first image region and a second image region, the first image region includes pixels corresponding to the first user, and the second image region includes pixels corresponding to the second user.

With reference to the second aspect, in some implementations of the second aspect, the first image region includes pixels corresponding to any one of a first background image, a second background image, and a target library image.

With reference to the second aspect, in some implementations of the second aspect, the second image region includes pixels corresponding to any one of the first background image, the second background image, and the target library image.

With reference to the second aspect, in some implementations of the second aspect, the co-photographing file further includes a background image region, the background image region is backgrounds of the first image region and the second image region, and the background image region includes pixels corresponding to any one of the first background image, the second background image, and the target gallery image.

With reference to the second aspect, in some implementations of the second aspect, resolution of the co-photographing file is higher than display resolution of the electronic device.

With reference to the second aspect, in some implementations of the second aspect, the co-photographing file is a co-photographing image or a co-photographing video.

According to a third aspect, a computer storage medium is provided, and includes computer instructions. When the computer instructions are run on an electronic device, the electronic device is enabled to perform the co-photographing method according to any possible implementation of the first aspect.

According to a fourth aspect, a computer program product is provided. When the computer program product runs on a computer, the computer is enabled to perform the co-photographing method according to any possible implementation of the first aspect.

DESCRIPTION OF EMBODIMENTS

The following describes technical solutions of this application with reference to accompanying drawings.

Terms used in the following embodiments are merely intended for describing specific embodiments, but are not intended to limit this application. As used in this specification of this application and the appended claims, singular expressions "one", "a", "the", "the foregoing", and "this" are intended to also include, for example, an expression "one or more" unless expressly indicated to the contrary in the context. It should be further understood that, in the following embodiments of this application, "at least one" and "one or more" mean one, two, or more. The term "and/or" is used to describe an association relationship between associated objects and represents that three relationships may exist. For example, A and/or B may represent the following cases: Only A exists, both A and B exist, and only B exists, where A and B each may be singular or plural. The character "/" usually indicates an "or" relationship between the associated objects.

References "one embodiment", "some embodiments", or the like described in this specification mean that a particular feature, structure, or characteristic described with reference to the embodiment is included in one or more embodiments of this application. Therefore, statements "in an embodiment", "in some embodiments", "in some other embodiments", and the like appeared in different places in this specification do not necessarily refer to a same embodiment, but mean "one or more but not all embodiments" unless otherwise specifically emphasized in another manner. The terms "include", "have", and variants thereof all mean "include but not limited to" unless otherwise specifically emphasized in another manner.

The following describes an electronic device provided in embodiments of this application, a user interface for such an electronic device, and embodiments for using such an electronic device. In some embodiments, the electronic device may be a portable electronic device that further includes other functions such as a personal digital assistant function and/or a music player function, for example, a mobile phone, a tablet computer, or a wearable electronic device (for example, a smartwatch) having a wireless communication function. An example embodiment of the portable electronic device includes but is not limited to a portable electronic device provided with iOS®, Android®, Microsoft®, or another operating system. The portable electronic device may alternatively be another portable electronic device, like a laptop (Laptop) computer. It should be further understood that, in some other embodiments, the foregoing electronic device may not be the portable electronic device but a desktop computer.

Figure 1:
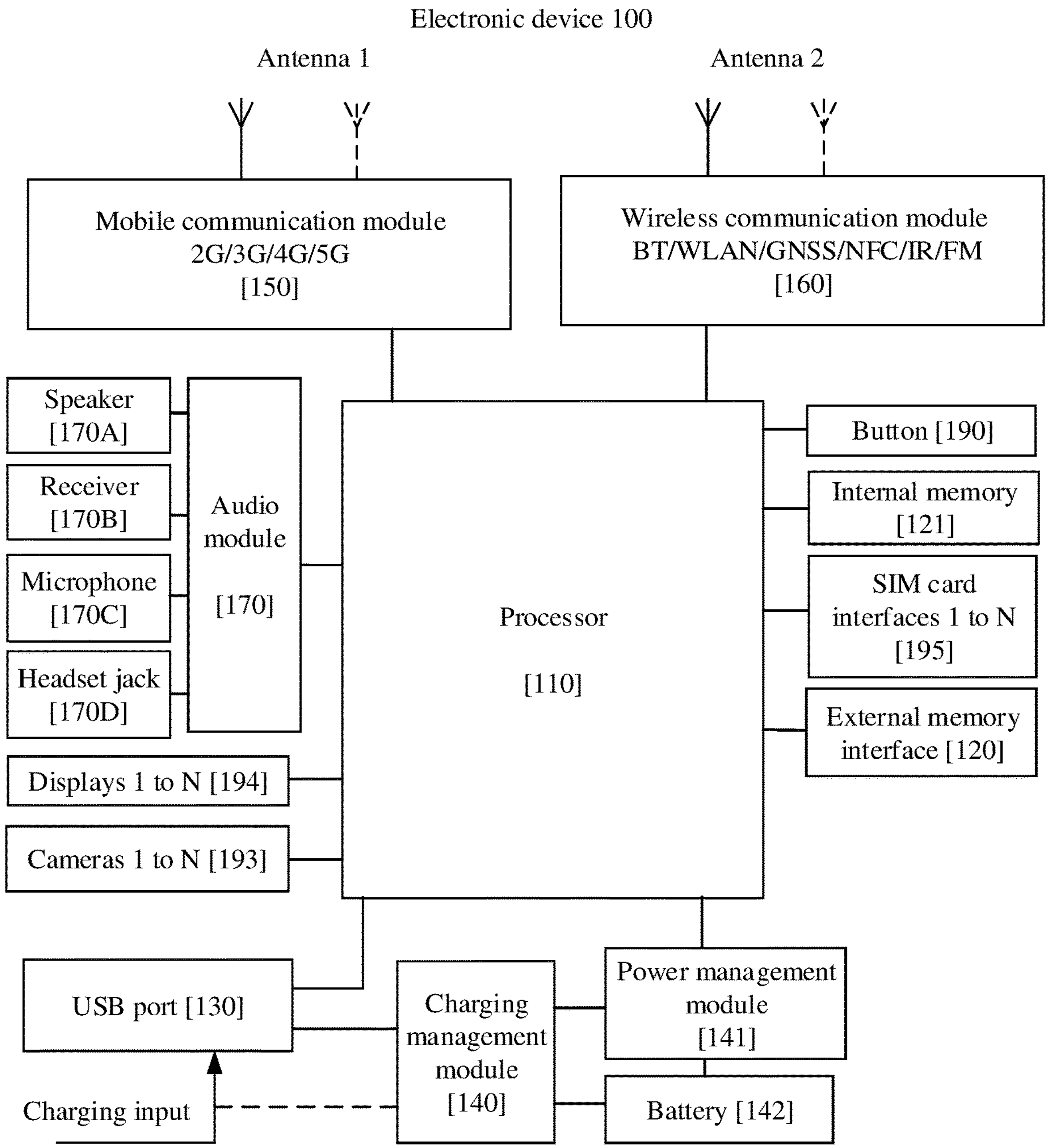
FIG. 1 is a schematic diagram of a structure of an electronic device according to an embodiment of this application.

For example, FIG. 1 is a schematic diagram of a structure of an electronic device 100. The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a button 190, a camera 193, a display 194, and a subscriber identification module (subscriber identification module, SIM) card interface 195, and the like.

It may be understood that the structure shown in this embodiment of this application does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors. In some embodiments, the electronic device 101 may alternatively include one or more processors 110. The controller may generate an operation control signal based on instruction operation code and a time sequence signal, to complete control of instruction reading and instruction execution. In some other embodiments, a memory may be further disposed in the processor 110, to store instructions and data. For example, the memory in the processor 110 may be a cache. The memory may store instructions or data that has been used or cyclically used by the processor 110. If the processor 110 needs to use the instructions or the data again, the processor may directly invoke the instructions or the data from the memory. This avoids repeated access and reduces a waiting time of the processor 110, thereby improving data processing or instruction execution efficiency of the electronic device 101.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM card interface, a USB port, and/or the like.

The USB port 130 is a port that conforms to a USB standard specification, and may be specifically a mini USB port, a micro USB port, a USB Type-C port, or the like. The USB port 130 may be configured to connect to a charger to charge the electronic device 101, or may be configured to transmit data between the electronic device 101 and a peripheral device. The USB port 130 may alternatively be configured to connect to a headset to play audio through the headset.

It may be understood that an interface connection relationship between the modules illustrated in this embodiment of this application is merely used as an example for description, and does not constitute a limitation on the structure of the electronic device 100. In some other embodiments of this application, the electronic device 100 may alternatively use an interface connection manner different from an interface connection manner in this embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB port 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to: transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communication module 150 may provide a wireless communication solution that is applied to the electronic device 100 and that includes 2G/3G/4G/5G or the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules in the mobile communication module 150 may be disposed in a same device as at least some modules of the processor 110.

The wireless communication module 160 may provide a wireless communication solution that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

The electronic device 100 implements a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or more displays 194.

The display 194 of the electronic device 100 may be a flexible display. Currently, the flexible display is greatly concerned about due to unique characteristics and great potential of the flexible display. Compared with a conventional screen, the flexible display has strong flexibility and bendable features, which can provide a user with a new interaction manner based on the bendable features and meet more requirements of the user for the electronic device. For an electronic device provided with a collapsible display, the collapsible display on the electronic device can switch between a small screen in a folded form and a large screen in an unfolded form at any time. Therefore, it is also increasingly frequent for the user to use a split-screen function on the electronic device provided with the collapsible display.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scene. In some embodiments, the ISP may be disposed in the camera 193.

The camera 193 is configured to capture a static image or a video. An object generates, through a lens, an optical image to be projected to a photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in a format like RGB or YUV. In some embodiments, the electronic device 100 may include one or more cameras 193.

The digital signal processor is configured to process a digital signal, and may process another digital signal in addition to a digital image signal. For example, when the electronic device 100 selects a frequency, the digital signal processor is configured to perform Fourier transform on frequency energy.

The video codec is configured to: compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information based on a structure of a biological neural network, for example, based on a transfer mode between human brain neurons; and may further continuously perform self-learning. Applications such as intelligent cognition of the electronic device 100 may be implemented through the NPU, for example, image recognition, facial recognition, speech recognition, and text understanding.

The external memory interface 120 may be used to connect to an external storage card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store one or more computer programs, and the one or more computer programs include instructions. The processor 110 may run the instructions stored in the internal memory 121, so that the electronic device 101 performs a screen-off display method provided in some embodiments of this application, various applications, data processing, and the like. The internal memory 121 may include a program storage region and a data storage region. The program storage region may store an operating system. The program storage region may further store one or more applications (for example, Gallery and Contacts), and the like. The data storage region may store data (for example, a photo and a contact) created during use of the electronic device 101, and the like. In addition, the internal memory 121 may include a high-speed random access memory, or may include a nonvolatile memory, for example, one or more magnetic disk storage devices, a flash memory device, or a universal flash storage (universal flash storage, UFS). In some embodiments, the processor 110 may run the instructions stored in the internal memory 121 and/or the instructions stored in the memory disposed in the processor 110, so that the electronic device 101 performs the screen-off display method provided in embodiments of this application, other applications, and data processing. The electronic device 100 may implement an audio function, for example, music playing and recording, through the audio module 170, the speaker 170A, the receiver 170B, the microphone 170C, the headset jack 170D, the application processor, and the like.

The button 190 includes a power button, a volume button, and the like. The button 190 may be a mechanical button, or may be a touch button. The electronic device 100 may receive a key input, and generate a key signal input related to a user setting and function control of the electronic device 100.

Figure 2:
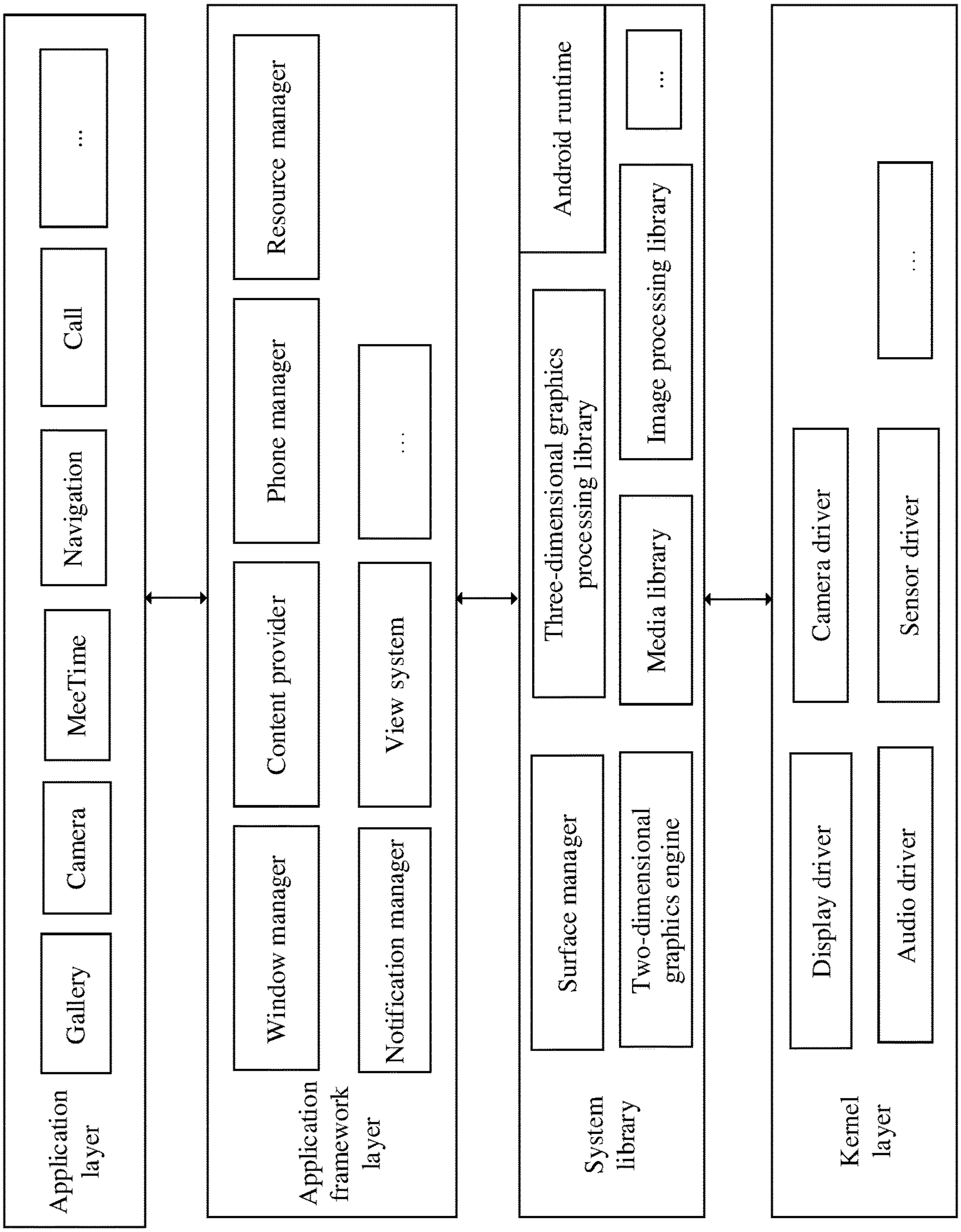
FIG. 2 is a block diagram of a software structure of an electronic device according to an embodiment of this application.

FIG. 2 is a block diagram of a software structure of an electronic device 100 according to an embodiment of this application. In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom. The application layer may include a series of application packages.

As shown in FIG. 2, the application packages may include applications such as Gallery, Camera, MeeTime, Map, and Navigation.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function for the electronic device 100, for example, management of call statuses (including answering, declining, and the like).

The resource manager provides various resources such as a localized character string, an icon, a picture, a layout file, and a video file for an application.

The notification manager enables an application to display notification information in a status bar, and may be configured to convey a notification message. The notification manager may automatically disappear after a short pause without requiring user interaction. For example, the notification manager is configured to: notify download completion, give a message notification, and the like. The notification manager may alternatively be a notification that appears in a top status bar of the system as a graph or a scroll bar text, for example, a notification of an application that is run on the background, or may be a notification that appears on the screen as a dialog window. For example, text information is displayed in the status bar, an announcement is given, the electronic device vibrates, or the indicator light blinks.

The Android runtime includes a core library and a virtual machine. The Android runtime is responsible for scheduling and management of the Android system.

The core library includes two parts: a function that needs to be called in Java language and a core library of Android.

The application layer and the application framework layer are run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (media library), a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording in a plurality of commonly used audio and video formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The solutions provided in embodiments of this application may be applied to a multi-user co-photographing scene, and in particular, may be applied to a remote multi-user co-photographing scene. The remote multi-user co-photographing scene may mean that at least two users cannot or are difficult to complete co-photographing at a same time through a same camera device. The following describes the remote multi-user co-photographing scene by using some examples.

Example 1

A user A may take a selfie by using an electronic device A with a camera function, to obtain a selfie video A; and a user B may take a selfie by using an electronic device B with a camera function. Finally, a co-photographing video of the user A and the user B may be obtained by synthesizing the video A and a video B. The selfie video A and the selfie video B may be obtained in an asynchronous photographing manner.

In this example, it may be difficult to coordinate the co-photographing video of the user A and the user B, that is, in a selfie process, it may be difficult to match many photographing factors of the user A and the user B. For example, a distance between the user A and the electronic device A may differ greatly from a distance between the user B and the electronic device B. Therefore, a contour size of the user A in the selfie video A differs greatly from a contour size of the user B in the selfie video B. For another example, the user A and the user B perform similar actions, but the action of the user A is a faster and bigger movement, and the action of the user B is a slower and smaller movement. A user needs to perform post-processing with a heavy workload on the co-photographing video, so that a processed co-photographing video can achieve a high matching degree.

Video shooting is used as an example for description of Example 1. Actually, a co-photographing picture obtained by using the method shown in Example 1 is troublesome similarly.

Example 2

A user A may make a video call with a user B by using an electronic device A with a camera function, and obtain, in a screen recording manner, a co-photographing video that includes both the user A and the user B.

However, definition of the co-photographing video obtained through screen recording is usually poor. Maximum resolution of the co-photographing video usually depends on display resolution of the electronic device A.

Video shooting is used as an example for description of Example 2. Actually, a co-photographing picture obtained by using the method shown in Example 2 is troublesome similarly.

Embodiments of this application provide a new co-photographing method, and objectives of this application include reducing a post-processing workload of a user on a co-photographing file (for example, a co-photographing image or a co-photographing video), improving definition of the co-photographing file, and the like, to help improve user experience of co-photographing by a plurality of users in different places.

Figure 3:
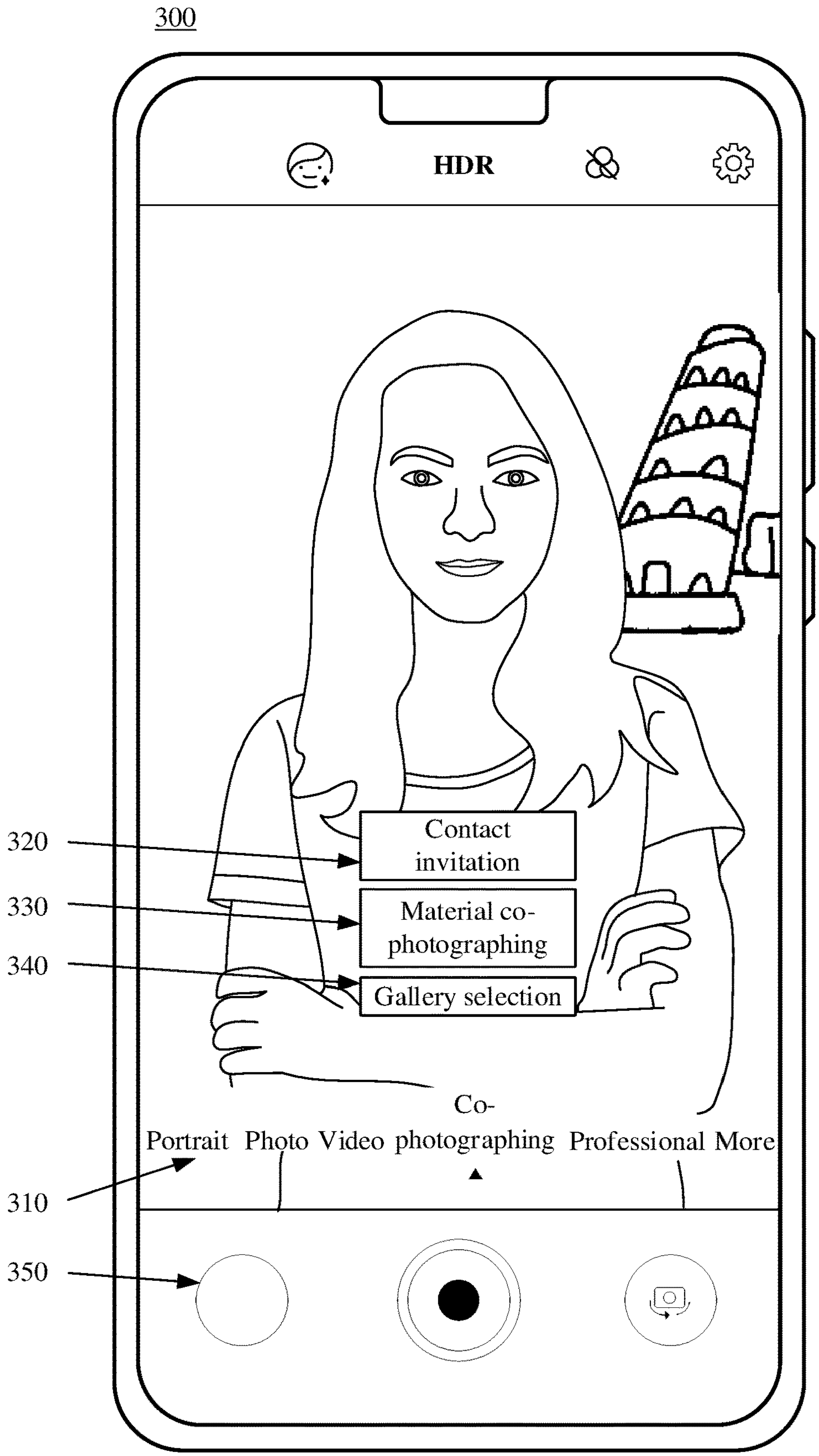
FIG. 3 is a schematic diagram of a structure of a user interface according to an embodiment of this application.

FIG. 3 is a schematic diagram of a user interface 300 according to an embodiment of this application. The user interface 300 may be displayed on a first electronic device. The user interface 300 may be an interface of a camera application, or an interface of another application having a photographing function. In other words, the first electronic device carries the camera application or the another application having the photographing function. The first electronic device may display the user interface 300 in response to an operation performed by a first user on these applications.

For example, the first user may open the camera application by tapping an icon thereof, so that the first electronic device can display the user interface 300. The camera application may invoke the camera 193 shown in FIG. 1 to photograph a scene around the first electronic device. For example, the camera application may invoke a front-facing camera of the first electronic device to take a selfie image of the first user, and display the selfie image in the user interface 300.

The user interface 300 may include a plurality of function controls 310 (the function controls 310 may be presented in the user interface 300 as tabs), and the plurality of function controls 310 may be in a one-to-one correspondence with a plurality of camera functions of the camera application. As shown in FIG. 3, the plurality of camera functions may include, for example, a portrait function, a photo function, a video function, a co-photographing function, and a professional function. The plurality of function controls 310 may include a portrait function control, a photo function control, a video function control, a co-photographing function control, and a professional function control.

The first electronic device may switch, in response to an operation (like a sliding operation) performed by the first user on the user interface 300, a current camera function to a function used to complete co-photographing, for example, the co-photographing function shown in FIG. 3. It should be understood that, in another possible example, the camera application may include another camera function for completing co-photographing. In this embodiment of this application, a co-photographing function is used as an example below for description.

When the current camera function is a co-photographing function, the user interface 300 may include a user co-photographing control 320. The user co-photographing control 320 may be used to select or invite a second user, to complete synchronous co-photographing of the first user and the second user. The first electronic device may display, in response to an operation (for example, a tap operation) performed by the first user on the user co-photographing control 320, a user interface 400 shown in FIG. 4.

Optionally, the user interface 300 may further include a material co-photographing control 330. The material co-photographing control 330 may be used to select a material from the cloud, to complete co-photographing of the first user and the material. The material may include, for example, a plurality of files such as a photo, a cartoon, an emoticon, a sticker, an animation, and a video.

For example, the first user may take a selfie of a video A through the first electronic device. The first electronic device may shoot the video A that includes the first user. The first electronic device may crop the video Abased on a contour of the first user in the video A, to obtain a user subvideo a, where the user subvideo a may include an image of the first user, and does not include an image of a background. The following uses a subframe A of a video A as an example for detailed description. The subframe A may include a plurality of pixels A, and the plurality of pixels A may include a plurality of pixels a corresponding to the contour of the first user. A plurality of pixels a' in the subframe A that are located within the plurality of pixels a may form a subframe a' of the user subvideo a. The first electronic device may synthesize the user subvideo a and the material to obtain a new video A', where the material may be used as a background of the user subvideo a in the video A'.

For another example, the first user may take a selfie of a video B through the first electronic device. The first electronic device may shoot a video B that includes the first user. The first electronic device may synthesize the video B and the material to obtain a new video B', where the video B may be used as a background of the material in the video B'.

Optionally, the user interface 300 may further include a gallery co-photographing control 340. The gallery co-photographing control 340 may be used to select multimedia data (where the multimedia data may include a picture and a video) from a local gallery, to complete co-photographing of the first user and the multimedia data.

For example, the first user may take a selfie of a video C through the first electronic device. The first electronic device may shoot a video C that includes the first user. The first electronic device may crop the video C based on a contour of the first user in the video C, to obtain a user subvideo c, where the user subvideo c may include an image of the first user, and does not include an image of a background. The first electronic device may synthesize the user subvideo c and the multimedia data to obtain a new video C', where the multimedia data may be used as a background of the user subvideo c in the video C'.

For another example, the first user may take a selfie of a video D through the first electronic device. The first electronic device may shoot a video D that includes the first user. The first electronic device may synthesize the video D and the multimedia data to obtain a new video D', where the video D may be used as a background of the multimedia data in the video D'.

Optionally, the user interface 300 may further include a gallery control 350. The first electronic device may jump to a gallery application in response to an operation performed by the first user on the gallery control 350, to view photographed multimedia data.

Figure 4:
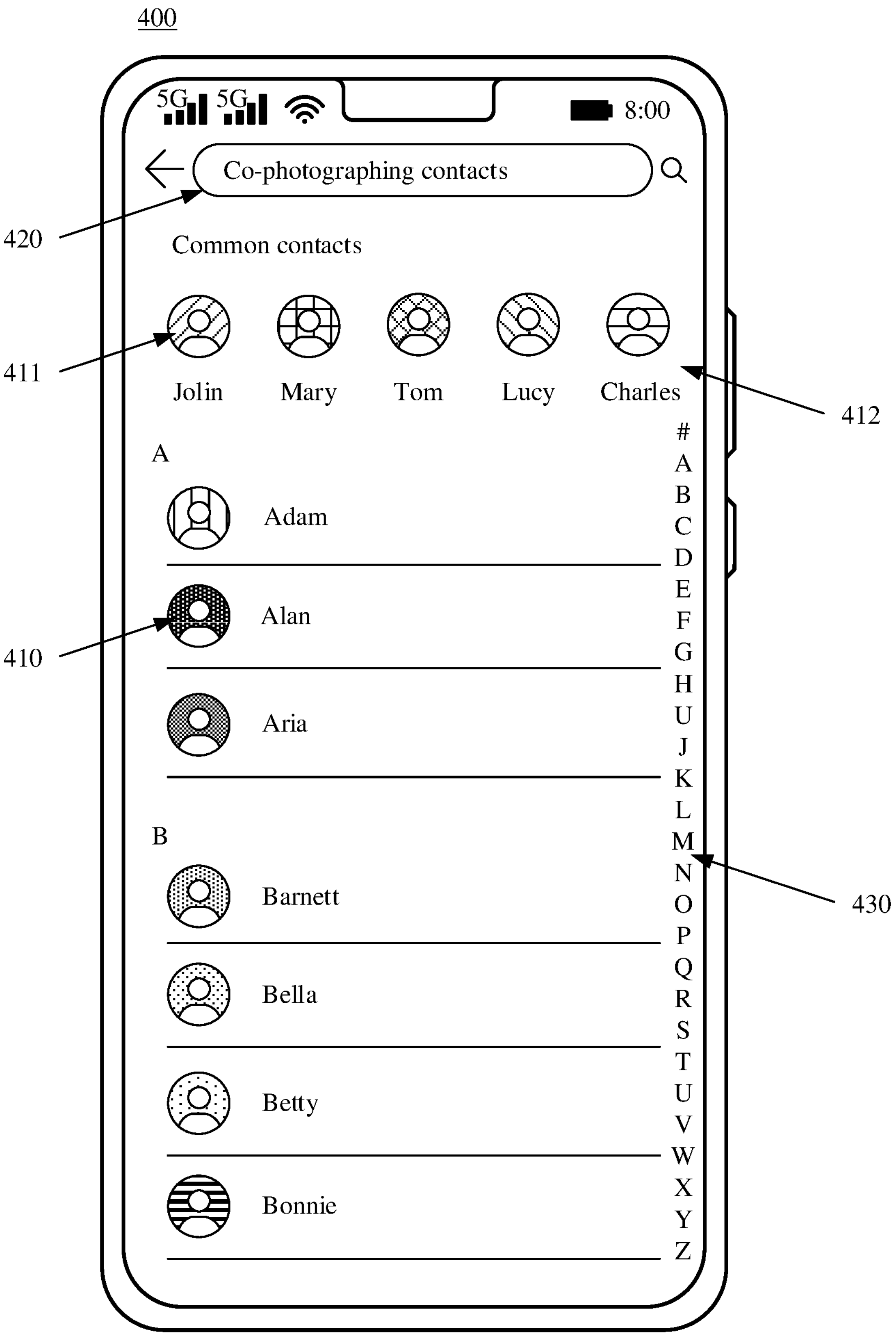
FIG. 4 is a schematic diagram of a structure of a user interface according to an embodiment of this application.

As shown in FIG. 4, the user interface 400 may include a plurality of user controls 410 that are in a one-to-one correspondence with a plurality of users. The user interface 400 may include a user control 411 of a second user. In other words, the plurality of users may include the second user.

As shown in FIG. 4, the user interface 400 may include a user search control 420. The first electronic device may obtain related information of the second user (for example, a part or all of a name of the second user, an initial letter of the name of the second user, and a part or all of a video call number of the second user) in response to an operation (for example, a tap operation) performed by the first user on the user search control 420 and a series of subsequent operations (for example, text input, voice input, and two-dimensional code scanning). The first electronic device may determine, based on the related information of the second user, a user record of the second user from a plurality of user records stored in the first electronic device, where the plurality of user records may be in a one-to-one correspondence with the plurality of users. In this way, the first electronic device can quickly display the user control 411 of the second user in the user interface 400.

The first user may invite, through the first electronic device, the second user to make a video call. For example, the first electronic device may initiate a video call to the second electronic device in response to an operation (for example, a tap operation) performed by the first user on the user control 411 of the second user, where the second electronic device may be an electronic device used by the second user. Correspondingly, the second user may receive the video call invitation of the first user through the second electronic device. The second electronic device may display a video call invitation interface, where the interface may include a video call answer control. A video call connection may be established between the first electronic device and the second electronic device in response to an operation performed by the second user on the video call answer control.

Optionally, the plurality of users may be, for example, arranged in alphabetical order, to help the first user quickly search for the second user.

Optionally, the user interface 400 may include a frequently-used user control 412. In an example, the first electronic device may collect statistics on a user with a largest quantity of times of co-photographing as a user A, and display a frequently-used user control A in the user interface 400, where the frequently-used user control A may be a control corresponding to the user A. In another example, the first electronic device may collect statistics on a user with a largest quantity of times of video calls as a user B, and display a frequently-used user control B in the user interface 400, where the frequently-used user control B may be a control corresponding to the user B.

After the first electronic device establishes a video call connection to the second electronic device, the first electronic device may obtain a first video through photographing, and the second electronic device may obtain a second video through photographing. In addition, the first electronic device may obtain the second video through the video call connection, and the second electronic device may obtain the first video through the video call connection. The first electronic device and/or the second electronic device may display a user interface 500 shown in FIG. 5.

Figure 5:
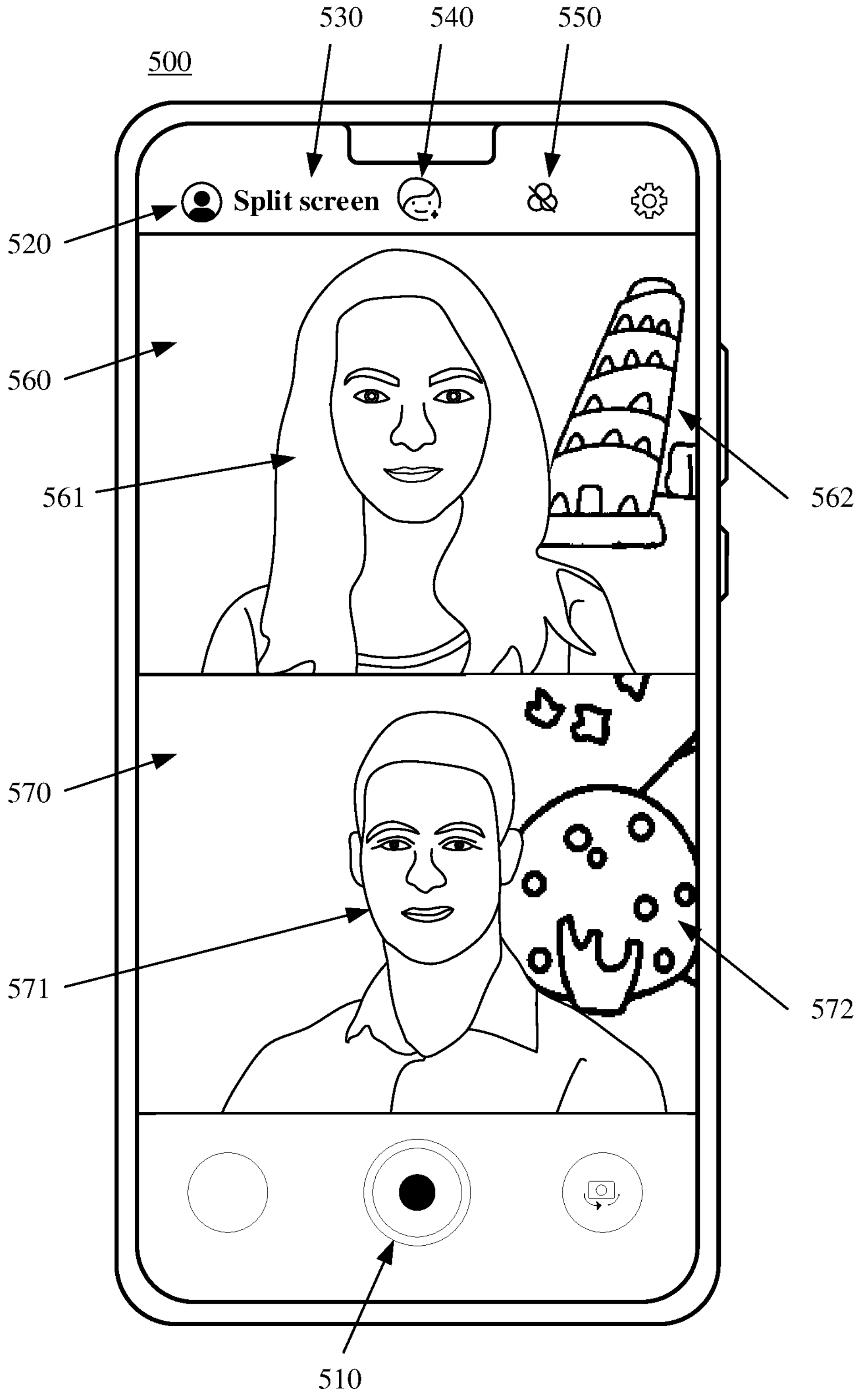
FIG. 5 is a schematic diagram of a structure of a user interface according to an embodiment of this application.

The user interface 500 may include a first interface region 560 and a second interface region 570. The first interface region 560 may display a part or all of an image currently shot by the first electronic device, and the second interface region 570 may display a part or all of an image currently shot by the second electronic device. The first interface region 560 and the second interface region 570 may not cross each other. The first interface region 560 and the second interface region 570 may be located at any location in the user interface 500. As shown in FIG. 5, the first interface region 560 may be located at an upper location in the user interface 500, and the second interface region 570 may be located at a lower location in the user interface 500. In other words, both the part or all of the image shot by the first electronic device and the part or all of the image shot by the second electronic device may be displayed in the user interface 500.

For example, as shown in FIG. 5, when the first user takes a selfie through a front-facing camera of the first electronic device, and the second user takes a selfie through a front-facing camera of the second electronic device, the first interface region 560 may include a first user image 561, and the second interface region 570 may include a second user image 571. In other words, the first interface region 560 may include pixels corresponding to the first user, and the second interface region 570 may include pixels corresponding to the second user. It should be understood that, in another example, the first electronic device and/or the second electronic device may use a rear-facing camera to shoot an image including a user.

The user interface 500 may include a recording control 510. An electronic device (if the user interface 500 is displayed on the first electronic device, the electronic device is the first electronic device; or if the user interface 500 is displayed on the second electronic device, the electronic device is the second electronic device, and similar cases are not described in detail below) may synthesize, in response to an operation performed by a user (if the user interface 500 is displayed on the first electronic device, the user is the first user; or if the user interface 500 is displayed on the second electronic device, the user is the second user, and similar cases are not described in detail below) on the recording control 510, a first video shot by the first electronic device and a second video shot by the second electronic device to obtain a target video. The target video includes a first image region and a second image region, the first image region corresponds to the first interface region 560, and the second image region corresponds to the second interface region 570.

As described in Example 2 above, the electronic device may obtain an image including both the user A and the user B in a screen recording manner. However, screen recording is actually obtaining display data of the electronic device instead of photographing data. Definition of the display data needs to be lower than definition of the photographing data. In other words, definition of the target video may be higher than display definition of the electronic device.

The user interface may further include a plurality of controls for adjusting a co-photographing effect. Before or during co-photographing, the user may use these controls to adjust the co-photographing effect. With reference to FIG. 5 to FIG. 13, the following describes some possible control examples provided in this application.

Optionally, as shown in FIG. 5, the user interface 500 may include a beauty on/off control 540.

When the beauty on/off control 540 is on, the electronic device may perform portrait beautification on a first user image 561 and/or a second user image 571. To be specific, the electronic device may display, in the user interface 500, the first user image 561 and/or the second user image 571 that are/is obtained through the portrait beautification. In a synthesized target video, a user image in the first image region and/or a user image in the second image region may be an image obtained through beauty processing.

When the beauty on/off control 540 is off, the electronic device may not perform portrait beautification on the first user image 561 and the second user image 571. To be specific, the electronic device may display the first user image 561 and the second user image 571 in the user interface 500 based on an original image of the first user and an original image of the second user, where the first user image 561 and the second user image 571 may be images existing before beauty processing is performed. In a synthesized target video, the user image in the first image region may be obtained based on the original image of the first user, and the user image in the second image region may be obtained based on the original image of the second user. That is, the user image in the first image region and the user image in the second image region may be images existing before beauty processing is performed.

Optionally, as shown in FIG. 5, the user interface 500 may further include a filter on/off control 550.

When the filter on/off control 550 is on, the electronic device may perform filter beautification on the image of the first video and/or the image of the second video. To be specific, the electronic device may display, in the user interface 500, the image of the first video and/or the image of the first video that are/is obtained through the filter beautification. In addition, in a synthesized target video, the image in the first image region and/or the image in the second image region may be an image obtained through the filter beautification.

When the filter on/off control 550 is off, the electronic device may not perform filter beautification on the first user image 561 and the second user image 571. To be specific, the electronic device may display, in the user interface 500 based on an original image of the first video and an original image of the second video, an image existing before filter processing is performed. In a synthesized target video, the image in the first image region may be obtained based on the original image of the first video, and the image in the second image region may be obtained based on the original image of the second first video. That is, the target video may not include an image obtained through the filter processing.

Optionally, as shown in FIG. 5, the user interface 500 may further include a background removal on/off control 520. When the background removal on/off control 520 is off, the electronic device may not remove a background of the first video and a background of the second video, that is, retain the background of the first video and the background of the second video. When the background removal on/off control 520 is on, the electronic device may, for example, remove a background of the first video and/or a background of the second video. For example, the electronic device may remove the background of the first video and retain the background of the second video. For another example, the electronic device may remove the background of the second video and retain the background of the first video. For another example, the electronic device may remove the background of the first video and the background of the second video.

The following uses an example to describe a relationship between a user image (or a user pixel or a user image block) and a background (or a background pixel or a background image block).

For example, a user e may take a selfie of a video through an electronic device e. When a video E shot by the electronic device e includes the user e, the electronic device e may crop the video E based on a contour of the user e in the video E, to obtain a user subvideo and a background subvideo. The user subvideo may include an image of the user e and does not include a background image. The background subvideo may include the background image and does not include the image of the user e.

The following uses a subframe E of the video E as an example for detailed description. The subframe E may include a plurality of pixels E, and the plurality of pixels E may include a plurality of pixels e corresponding to the contour of the user e. A plurality of pixels e' in the subframe E that are located within the plurality of pixels e may form a subframe e' of the user subvideo, and may form the image of the user e. A plurality of pixels e" in the subframe E that are located outside the plurality of pixels e may form a subframe e" of the background subvideo, and may form the background image.

In the example shown in FIG. 5, the background removal on/off control 520 is currently off.

The first user image 561 and the first background image 562 may be displayed in the first interface region 560. The first background image 562 may be a background image of the first user. The first background image 562 may be obtained by photographing a scene in which the first user is shown. In other words, the first interface region 560 may include pixels corresponding to the first user and pixels corresponding to the scene in which the first user is shown.

Similarly, a second user image 571 and a second background image 572 may be displayed in the second interface region 570. The second background image 572 may be a background image of the second user. The second background image 572 may be obtained by photographing a scene in which the second user is shown. To be specific, the second interface region 570 may include pixels corresponding to the second user and pixels corresponding to the scene in which the second user is shown.

Figure 6:
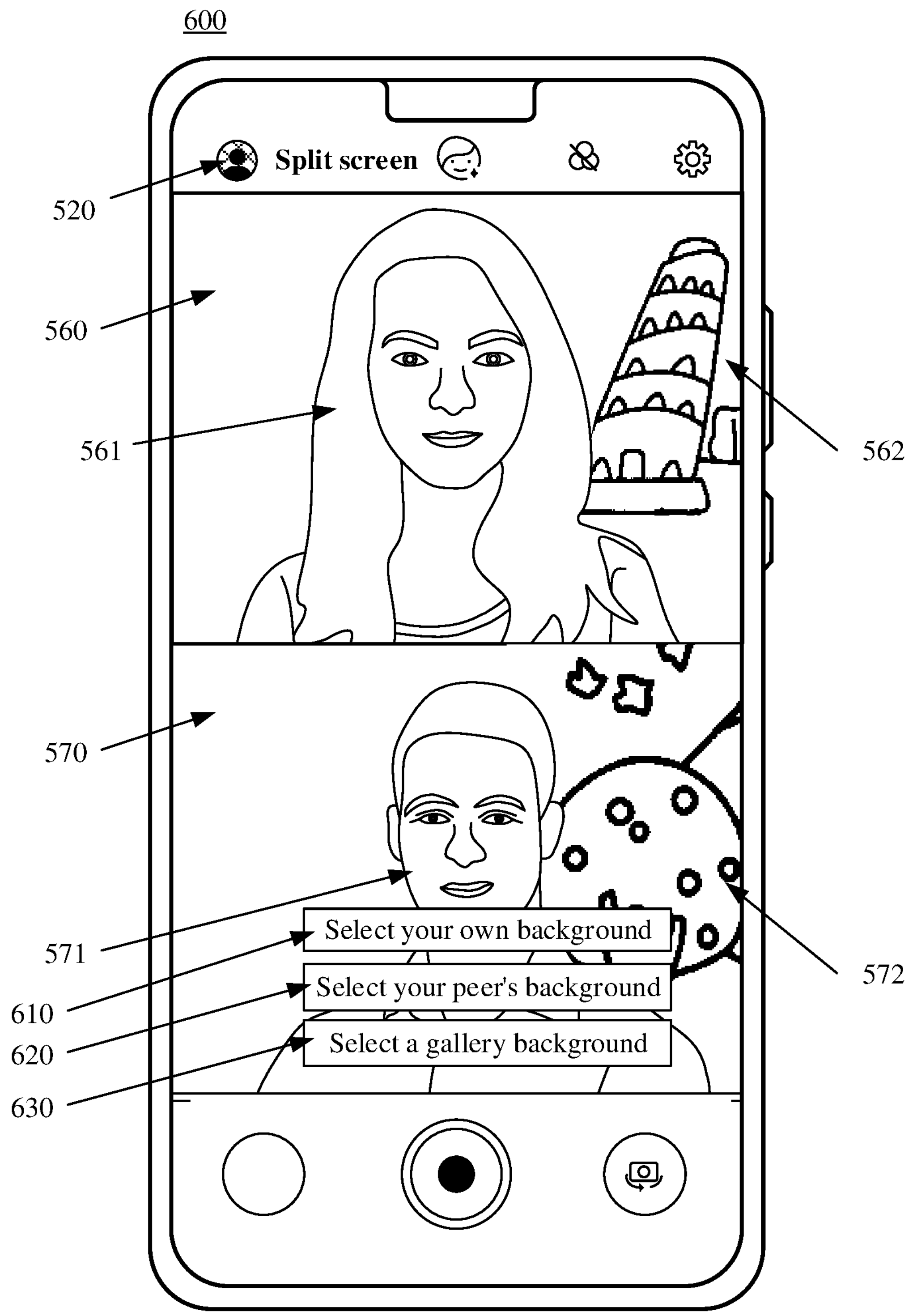
FIG. 6 is a schematic diagram of a structure of a user interface according to an embodiment of this application.

As shown in FIG. 6, when the background removal on/off control 520 is on, the electronic device may display a user interface 600. The user interface 600 may include a first user background control 610, a second user background control 620, and a gallery background control 630.

The first user background control 610 may indicate the electronic device to display the first background image 562 in both the first interface region 560 and the second interface region 570.

Figure 7:
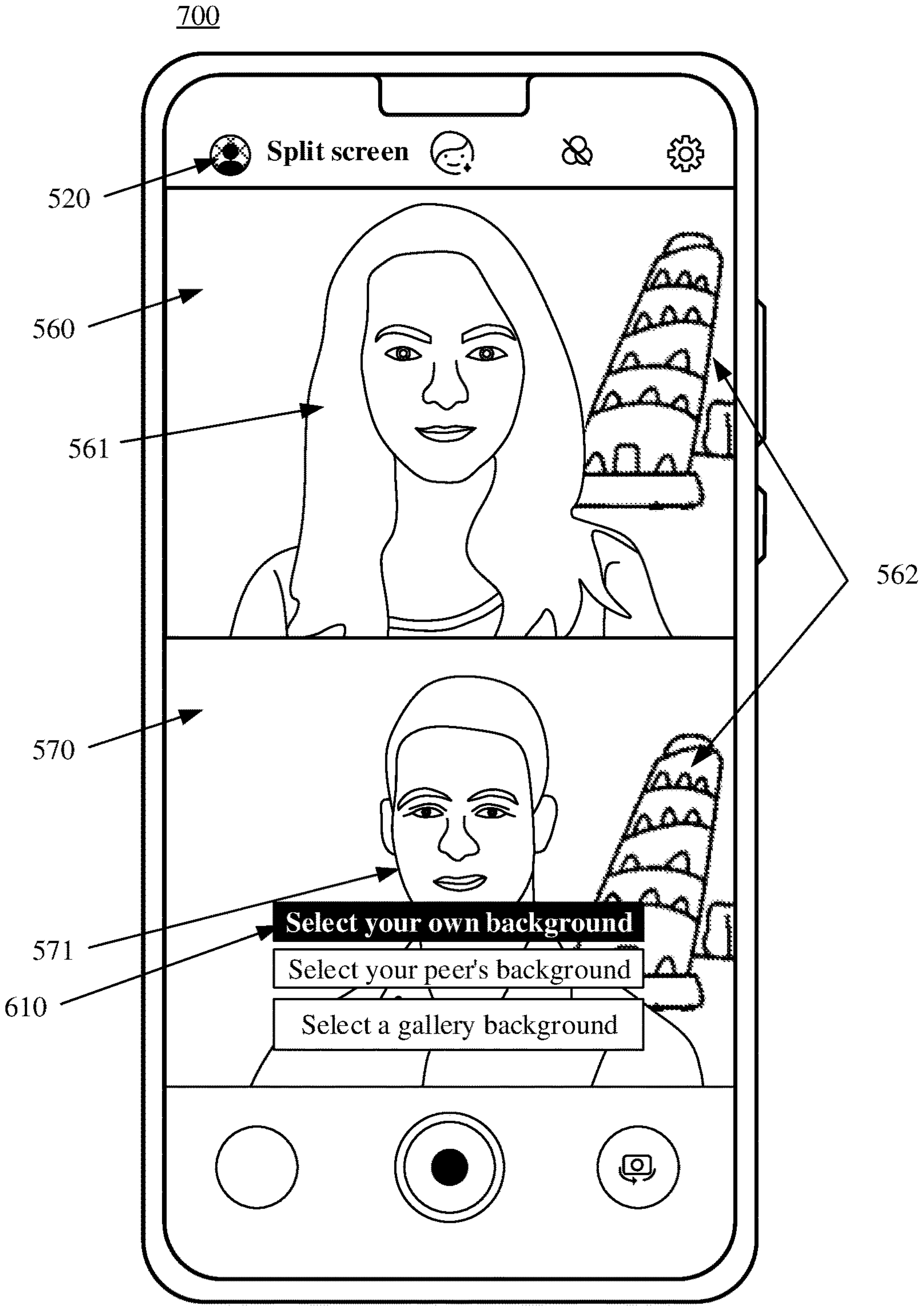
FIG. 7 is a schematic diagram of a structure of a user interface according to an embodiment of this application.

As shown in a user interface 700 in FIG. 7, the first interface region 560 may display a first video shot by the first electronic device, where the first video may include the first user image 561 and the first background image 562, and the first background image 562 includes image information of the scene in which the first user is shown. The second user image 571 and the first background image 562 are displayed in the second interface region 570, and the second user image 571 may be a part of a second video shot by the second electronic device. The second interface region 570 may not display the second background image 572 shown in FIG. 5 or FIG. 6. To be specific, the second interface region 570 may not include pixels corresponding to the scene in which the second user is shown.

The electronic device may obtain a target video by synthesizing the first user image 561 in the first video, the first background image 562 in the first video, and the second user image 571 in the second video, where a first image region of the target video may correspond to the first user image 561 and the first background image 562, and a second image region of the target video may correspond to the second user image 571 and the first background image 562.

For example, the electronic device may obtain the first video and the second video in the foregoing manner; the electronic device may determine the first background image 562 based on the first video; the electronic device may synthesize the first background image 562 and the second user image 571 to obtain a third video; the electronic device may display the first video in the first interface region 560, and display the third video in the second interface region 570; and the electronic device may synthesize the first video and the third video into the target video, where the first video corresponds to the first image region of the target video, and the third video corresponds to the second image region of the target video.

The second user background control 620 may indicate the electronic device to display the second background image 572 in both the second interface region 570 and the second interface region 570.

Figure 8:
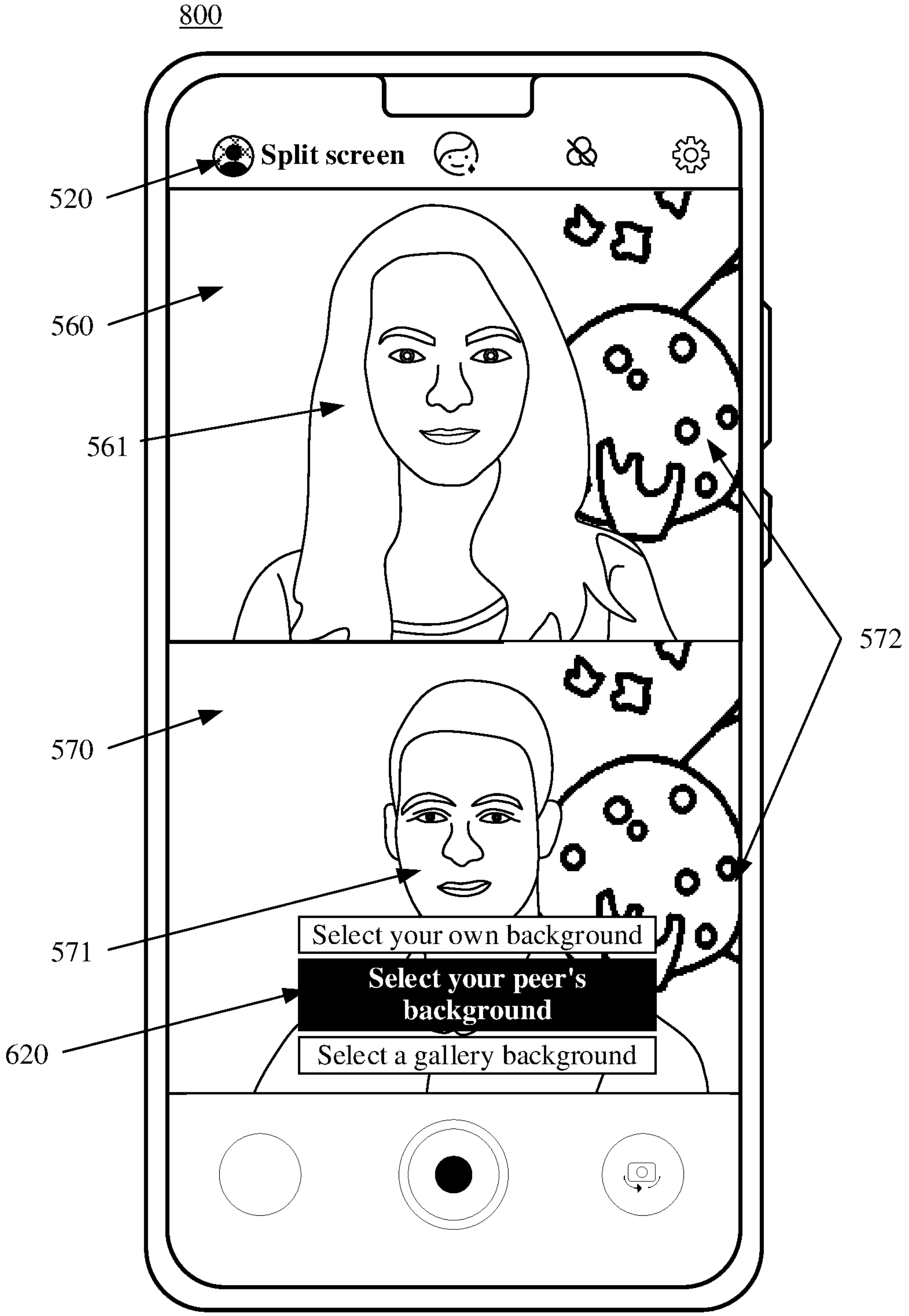
FIG. 8 is a schematic diagram of a structure of a user interface according to an embodiment of this application.

As shown in a user interface 800 in FIG. 8, the second interface region 570 may display a second video shot by the second electronic device, where the second video may include the second user image 571 and the second background image 572, and the second background image 572 includes image information of the scene in which the second user is shown. The first interface region 560 displays the first user image 561 and the second background image 572, and the first user image 561 may be a part of a first video shot by the first electronic device. The first interface region 560 may not display the first background image 562 shown in FIG. 5 or FIG. 6. In other words, neither the first interface region 560 nor the first image region may include pixels corresponding to the scene in which the first user is shown.

To be specific, the electronic device may obtain a target video by synthesizing the first user image 561 in the first video, the second user image 571 in the second video, and the second background image 572 in the second video, where a first image region of the target video may correspond to the first user image 561 and the second background image 572, and a second image region of the target video may correspond to the second user image 571 and the second background image 572.

For example, the electronic device may obtain the first video and the second video in the foregoing manner; the electronic device may determine the second background image 572 based on the second video; the electronic device may synthesize the second background image 572 and the first user image 561 to obtain a fourth video; the electronic device may display the fourth video in the first interface region 560, and display the second video in the second interface region 570; and the electronic device may synthesize the second video and the fourth video into the target video, where the fourth video corresponds to the first image region of the target video, and the second video corresponds to the second image region of the target video.

The gallery background control 630 may indicate the electronic device to obtain a target gallery image 910 from a gallery, and set the target gallery image 910 as a background image. The target gallery image 910 may come from a video or an image that is stored in the electronic device in advance. The target gallery image 910 may be a subframe of the video. For example, when users take a co-photographing video, a subframe of the co-photographing video may correspond to the target gallery image, and a plurality of subframes of the co-photographing video may be in a one-to-one correspondence with a plurality of subframes of a video in which the target gallery image is located.

In an example, the electronic device may display the target gallery image 910 and the first user image 561 in the first interface region 560, where the target gallery image 910 may be a background image of the first user. In another example, the electronic device may display the target gallery image 910 and the second user image 571 in the second interface region 570, where the target gallery image 910 may be a background image of the second user.

Figure 9:
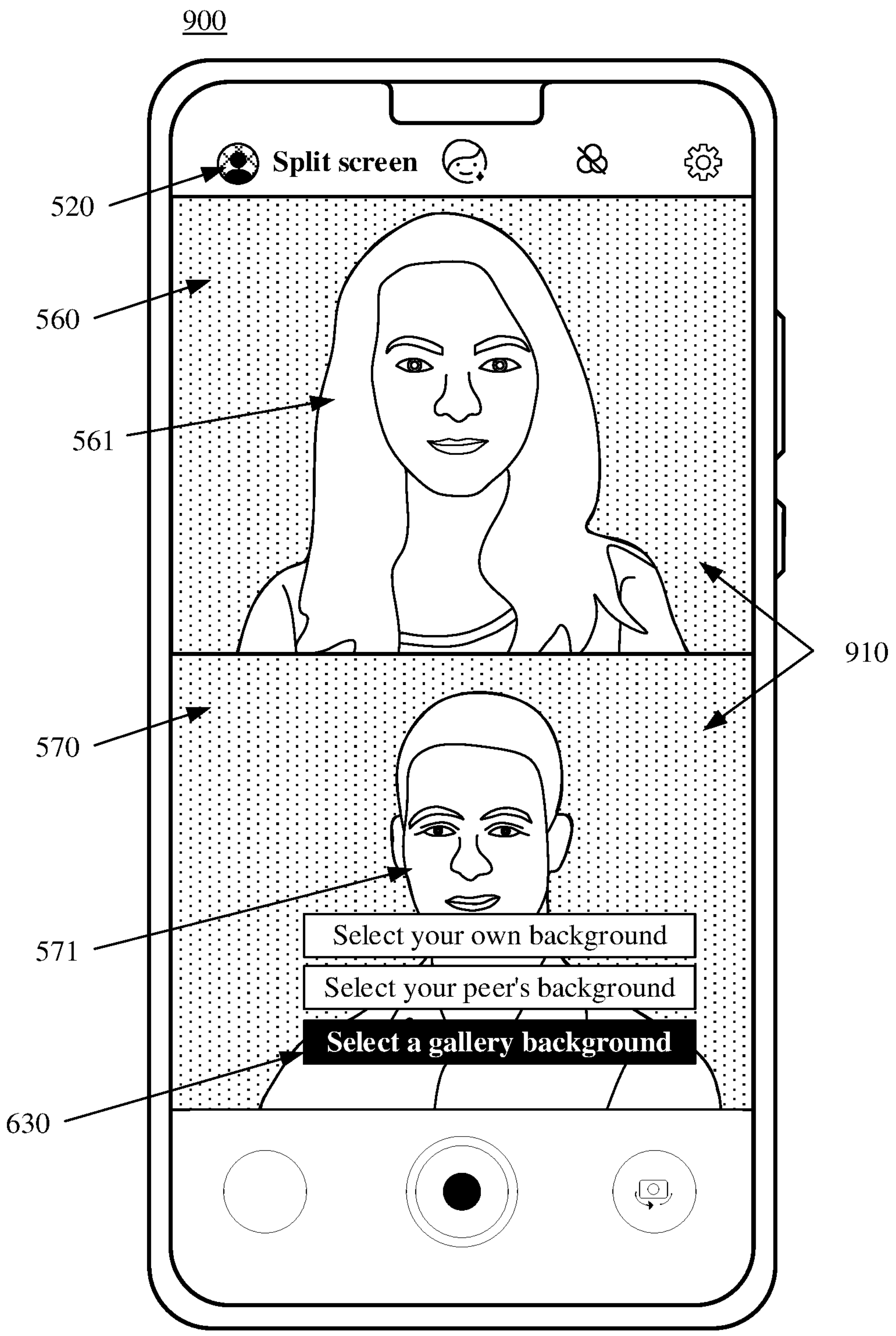
FIG. 9 is a schematic diagram of a structure of a user interface according to an embodiment of this application.

As shown in a user interface 900 in FIG. 9, the first interface region 560 may display the first user image 561 and the target gallery image 910, and the first user image 561 may be a part of a first video shot by the first electronic device. In other words, the first interface region 560 may include pixels corresponding to the first user and pixels corresponding to the target gallery image 910. The first interface region 560 may not display the first background image 562 shown in FIG. 5 or FIG. 6, and may not display the second background image 572 shown in FIG. 8.

As shown in the user interface 900 in FIG. 9, the second interface region 570 may display the second user image 571 and the target gallery image 910, and the second user image 571 may be a part of a second video shot by the second electronic device. In other words, the second interface region 570 may include pixels corresponding to the second user and pixels corresponding to the target gallery image 910. The second interface region 570 may not display the second background image 572 shown in FIG. 5 or FIG. 6, and may not display the first background image 562 shown in FIG. 7.

The electronic device may obtain a target video by synthesizing the first user image 561 in the first video, the second user image 571 in the second video, and the target gallery image 910, where a first image region of the target video may correspond to the first user image 561 and the target gallery image 910, and a second image region of the target video may correspond to the second user image 571 and the target gallery image 910.

For example, the electronic device may obtain the first video and the second video in the foregoing manner; the electronic device may determine the first user image 561 based on the first video; the electronic device may determine the second user image 571 based on the second video; the electronic device may synthesize the target gallery image 910 and the first user image 561 to obtain a fifth video; the electronic device may synthesize the target gallery image 910 and the second user image 571 to obtain a sixth video; the electronic device may display the fifth video in the first interface region 560, and display the sixth video in the second interface region 570; and the electronic device may synthesize the fifth video and the sixth video into the target video, where the fifth video corresponds to the first image region of the target video, and the sixth video corresponds to the second image region of the target video.

In an example, the user interfaces shown in FIG. 6 to FIG. 9 may be displayed on the first electronic device. In this case, "Select your own background" in FIG. 6 to FIG. 9 may correspond to the first user background control 610, and "Select your peer's background" in FIG. 6 to FIG. 9 may correspond to the second user background control 620. In another example, the user interfaces shown in FIG. 6 to FIG. 9 may be displayed on the second electronic device. In this case, "Select your own background" in FIG. 6 to FIG. 9 may correspond to the second user background control 620, and "Select your peer's background" in FIG. 6 to FIG. 9 may correspond to the first user background control 610.

Figure 10:
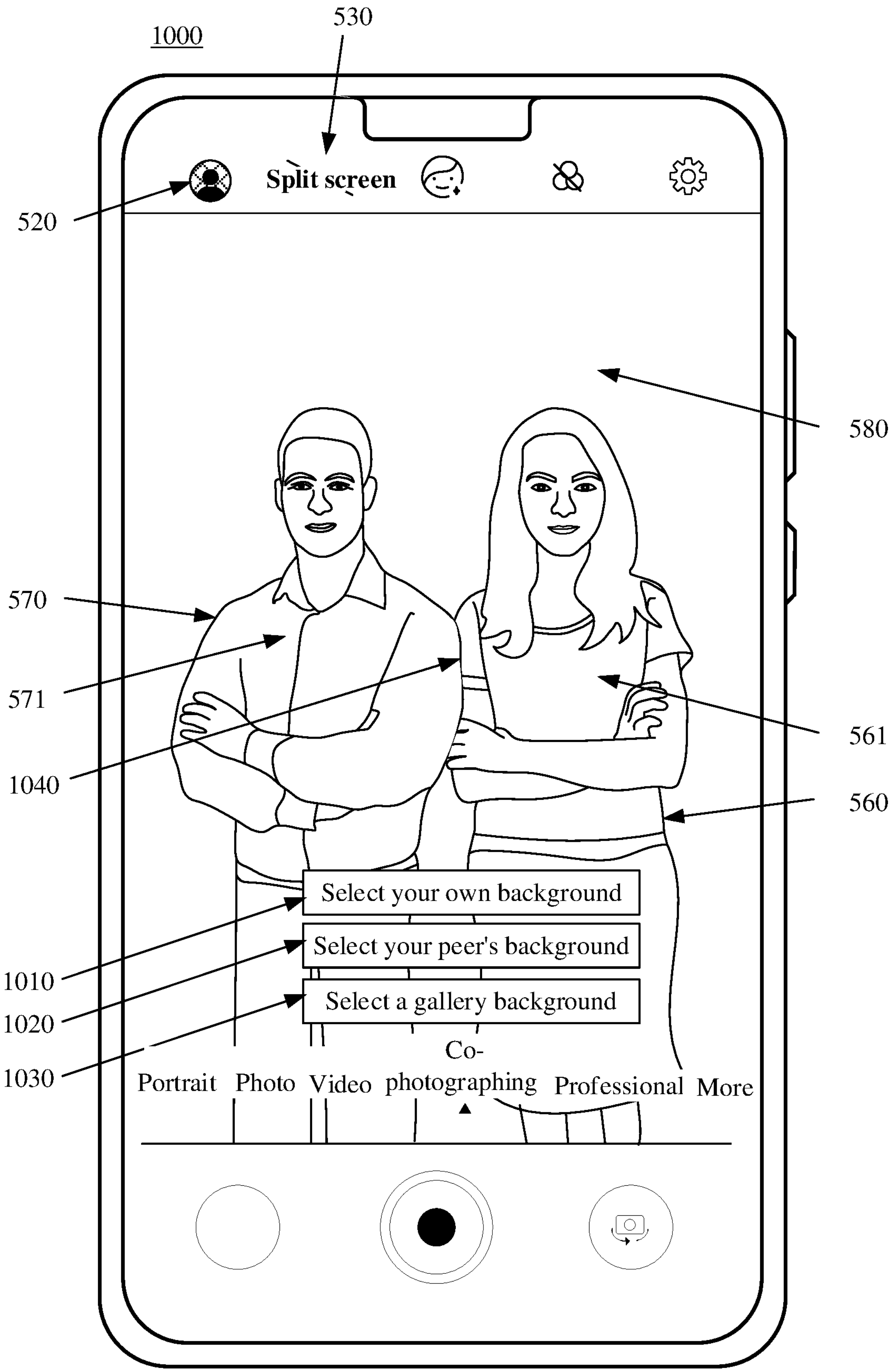
FIG. 10 is a schematic diagram of a structure of a user interface according to an embodiment of this application.

Optionally, as shown in FIG. 5 and FIG. 10, the user interface may further include a split-screen on/off control 530.

As shown in the user interface 500 in FIG. 5, when the split screen on/off control 530 is on, the first interface region 560 and the second interface region 570 may be, for example, two regular display regions. To be specific, a contour of the first interface region 560 may not match (or do not correspond to) the contour of the first user, and a contour of the second interface region 570 may not match (or do not correspond to) the contour of the second user. An area of the first interface region 560 and an area of the second interface region 570 may correspond to, for example, a fixed ratio (for example, 1:1 or 1:1.5). In the example shown in FIG. 5, the split screen on/off control 530 is currently on. Both the first interface region 560 and the second interface region 570 may be in a rectangular shape.

The electronic device may perform, in response to an operation performed by a user on the recording control 510, an operation of synthesizing videos to obtain a target video, where a first image region and a second image region of the target video may be two regular display regions. A contour of the first image region 560 may not match (or do not correspond to) the contour of the first user, and a contour of the second image region 570 may not match (or do not correspond to) the contour of the second user. An area of the first image region 560 and an area of the second image region 570 may correspond to, for example, a fixed ratio (for example, 1:1 or 1:1.5). With reference to the example shown in FIG. 5, both the first image region and the second image region may be in a rectangular shape.

As shown in FIG. 10, when the split screen on/off control 530 is off, a contour of the first interface region 560 may match (or correspond to), for example, the contour of the first user, and a contour of the second interface region 570 may match (or correspond to), for example, the contour of the second user. Optionally, when the split screen on/off control 530 is off, the background removal on/off control 520 may be off. In other words, the first interface region 560 may not include the first background image 562 in the first video shown in FIG. 5 or FIG. 6, and the second interface region 570 may not include the second background image 572 in the second video shown in FIG. 5 or FIG. 6.

Because the synthesized target video may correspond to a user interface displayed by the electronic device, the contour of the first image region 560 may match (or correspond to) the contour of the first user, and the contour of the second image region 570 may match (or correspond to) the contour of the second user. In other words, the first image region 560 may not include the first background image 562 in the first video shown in FIG. 5 or FIG. 6, and the second image region 570 may not include the second background image 572 in the second video shown in FIG. 5 or FIG. 6.

As shown in a user interface 1000 in FIG. 10, when a display conflict may exist between the first user image 561 and the second user image 571 in the user interface 1000, the electronic device may preferentially display the first user image 561 or the second user image 571. In other words, the first user image 561 may cover the second user image 571. In this case, a display priority of the first user image 561 or the first interface region 560 may be higher than a display priority of the second user image 571 or the second interface region 570. Alternatively, the second user image 571 may cover the first user image 561. In this case, a display priority of the first user image 561 or the first interface region 560 may be higher than a display priority of the second user image 571 or the second interface region 570.

For example, the electronic device may display the first user image 561 in front of the second user image 571 in response to an operation performed by the user on the first interface region 560 or the second interface region 570. In this case, the contour of the first interface region 560 may be determined based on the first user image 561, and the contour of the second interface region 570 may be determined based on the second user image 571 and a part that is of the first user image 561 and that overlaps the second user image 571. In a possible scene, the first interface region 560 may display all pixels of the first user image 561, and the second interface region 570 may display only some pixels of the second user image 571.

Because the synthesized target video may correspond to a user interface displayed by the electronic device, the contour of the first image region may be determined based on the first user image 561, and the contour of the second image region may be determined based on the second user image 571 and a part that is of the first user image 561 and that overlaps the second user image 571. The first image region may include all pixels corresponding to the first user image 561, and the second image region may include some pixels corresponding to the second user image 571.

For another example, the electronic device may display the second user image 571 in front of the first user image 561, for example, at a location pointed by an arrow 1040 in FIG. 10, in response to an operation performed by the user on the second interface region 570. In this case, the contour of the second interface region 570 may be determined based on the second user image 571, and the contour of the first interface region 560 may be determined based on the first user image 561 and a part that is of the second user image 571 and that overlaps the first user image 561. In a possible scene, the second interface region 570 may display all pixels of the second user image 571, and the first interface region 560 may display only some pixels of the first user image 561.

Because the synthesized target video may correspond to a user interface displayed by the electronic device, the contour of the second image region may be determined based on the second user image 571, and the contour of the first image region may be determined based on the first user image 561 and a part that is of the second user image 571 and that overlaps the first user image 561. The first image region may include only some pixels corresponding to the first user image 561, and the second image region may include all pixels corresponding to the second user image 571.

To reduce a workload of post-processing a video by the user, the user may adjust display sizes of the first user image 561 and the second user image 571, to adjust size percentages of the image of the first user and the image of the second user in the target video.

For example, the user may perform a scaling operation in the first interface region 560. The electronic device may scale up or down the first interface region 560 in response to the scaling operation performed by the user on the first interface region 560. Because the contour of the first interface region 560 matches the contour of the first user image 561, a display percentage of the first user image 561 in the user interface 1000 may be adjusted. Correspondingly, an image percentage of the first image region in the target video may be adjusted.

For another example, the user may perform a scaling operation in the second interface region 570. The electronic device may scale up or down the second interface region 570 in response to the scaling operation performed by the user on the second interface region 570. Because the contour of the second interface region 570 matches the contour of the second user image 571, a display percentage of the second user image 571 in the user interface 1000 may be adjusted. Correspondingly, an image percentage of the second image region in the target video may be adjusted.

For another example, the user may perform a scaling operation in the user interface 1000. The electronic device may adjust display percentages of the first interface region 560 and the second interface region 570 in the user interface 1000 in response to the scaling operation performed by the user in the user interface 1000. Correspondingly, both image percentages of the first image region and the second image region in the target video may be adjusted. In other words, the electronic device may have a capability of adjusting sizes of a plurality of user images at a time.

A display percentage of the first interface region 560 in the user interface may be a first display percentage, and a display percentage of the second interface region 570 in the user interface may be a second display percentage. The display percentage of the interface region in the user interface may be understood as a percentage of a quantity of pixels in the interface region in a quantity of pixels in the user interface.

In a possible example, after the electronic device adjusts the display percentages of the first interface region 560 and the second interface region 570 in the user interface, the first display percentage and the second display percentage may be the same or approximately the same. For example, a quantity of pixels included in the first interface region 560 is the same as or slightly different from a quantity of pixels included in the second interface region 570. In this display manner, display percentages of a plurality of user images in the user interface may not differ greatly. This display manner is more applicable to a scene in which there are a large quantity of co-photographing users, and helps reduce a workload of adjusting the display percentages of the user images one by one by the user. In the example shown in FIG. 10, when the user observes the user interface, the image of the first user and the image of the second user may appear to be the same in size.

In another possible example, a percentage of the first user image 561 in the first video may be a first image percentage (in a frame of a video image, an image percentage may be a percentage of a quantity of pixels of a user image in a total quantity of pixels of the frame), a percentage of the second user image 571 in the second video may be a second image percentage, a ratio of the first display percentage to the first image percentage (when a ratio of a display percentage to an image percentage is 1, it may be understood that the electronic device displays a user image based on an original size of the user image in a video) may be a first ratio, and a ratio of the second display percentage to the second image percentage may be a second ratio. After the electronic device adjusts the display percentages of the first interface region 560 and the second interface region 570 in the user interface, the first ratio may be the same as the second ratio.

For example, if the first user image 561 accounts for a large proportion of the first video, and the second user image 571 accounts for a small proportion of the second video, a proportion of the first user image 561 in the user interface may be greater than a proportion of the second user image 571 in the second video. This display manner may be closer to display of an original video. The user may adjust, in a manner of approaching a camera or moving away from a camera, a size of the user in the user interface and the target video obtained through the co-photographing. Pixels of the original video can be basically restored to the target video obtained through the co-photographing, which helps improve definition of the co-photographing video. In the example shown in FIG. 10, a display percentage of the user image in the user interface during co-photographing may match a display percentage of the user image in the user interface during the selfie. This helps the user more easily adapt to the co-photographing method provided in this embodiment of this application.

As shown in FIG. 10, the user interface 1000 may further include a background interface region 580. In the example shown in FIG. 10, pixels in the background interface region 580 may be, for example, a default value (for example, considered as gray or white by default). Optionally, the background interface region 580 may display any one of the first background image 562, the second background image 572, and the target gallery image 910. Correspondingly, the target video may include a background image region. The background image region may correspond to any one of the first background image 562, the second background image 572, and the target gallery image 910.

Figure 11:
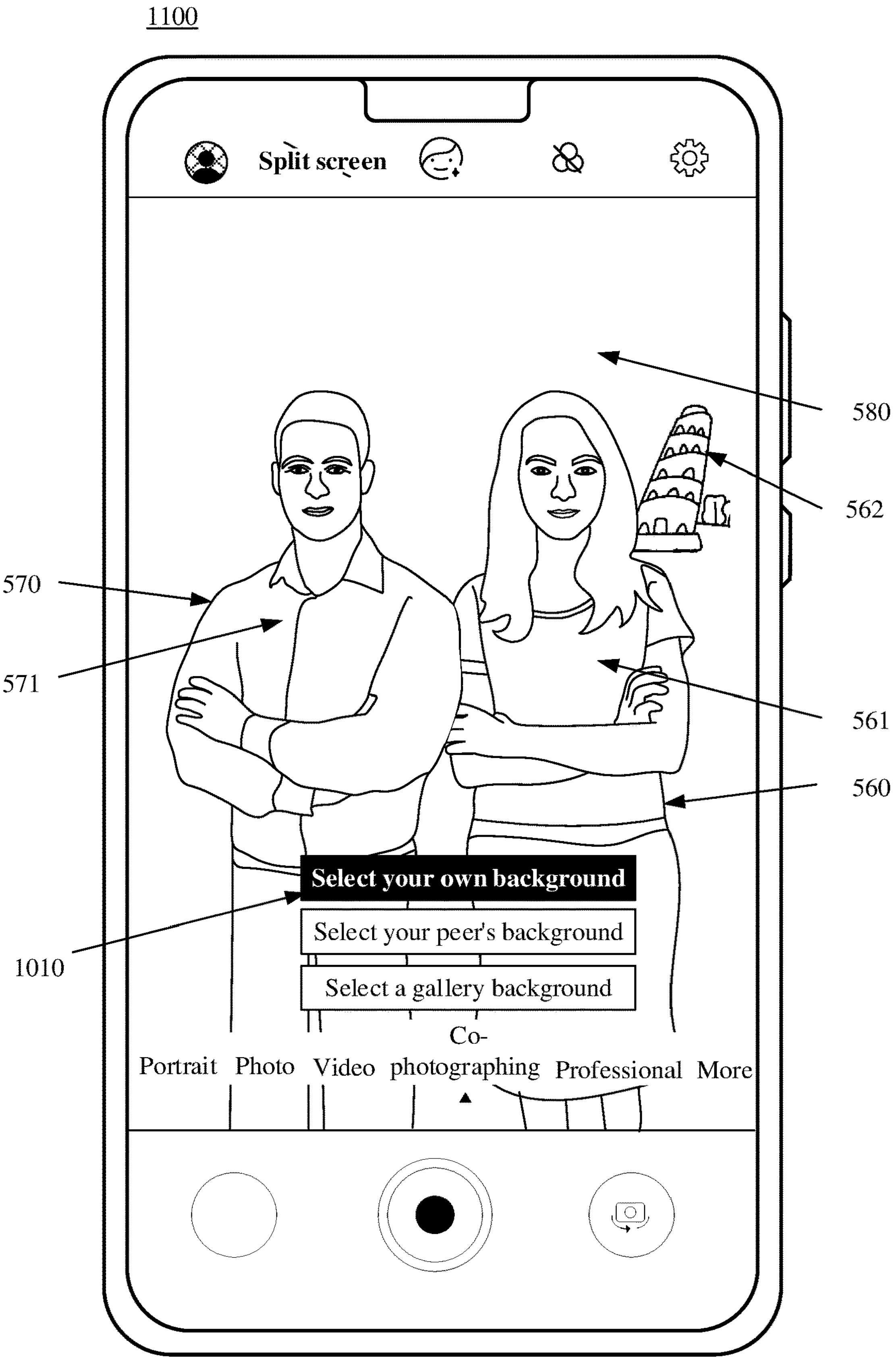
FIG. 11 is a schematic diagram of a structure of a user interface according to an embodiment of this application.

In an example, as shown in FIG. 10 and FIG. 11, the user interface may include a first user background control 1010.

The first user background control 1010 may indicate the electronic device to display the first background image 562 in the background image region. The electronic device may display the target gallery image 910 in the background interface region 580 in response to an operation performed by the user on the first user background control 1010. As shown in FIG. 11, the background interface region 580 may include pixels corresponding to the first background image 562. In some possible implementations, the electronic device may hide the first user background control 1010 in the user interface. For example, the electronic device may automatically hide the first user background control 1010 in the user interface, so that the first user background control 1010 does not block the first background image 562. Optionally, the electronic device may further hide the second user background control 1020 and the gallery background control 1030. Because the user has selected an appropriate background image, the electronic device may hide some controls, so that the user interface is simplified, and blocking of the controls on a preview video is reduced.

Because the synthesized target video may correspond to the user interface displayed by the electronic device, the electronic device may synthesize the first user image 561 in the first video, the second user image 571 in the second video, and the target gallery image 910 to obtain the target video, where a first image region of the target video may correspond to the first user image 561, a second image region of the target video may correspond to the second user image 571, and a background image region of the target video may correspond to the target gallery image 910.

Figure 12:
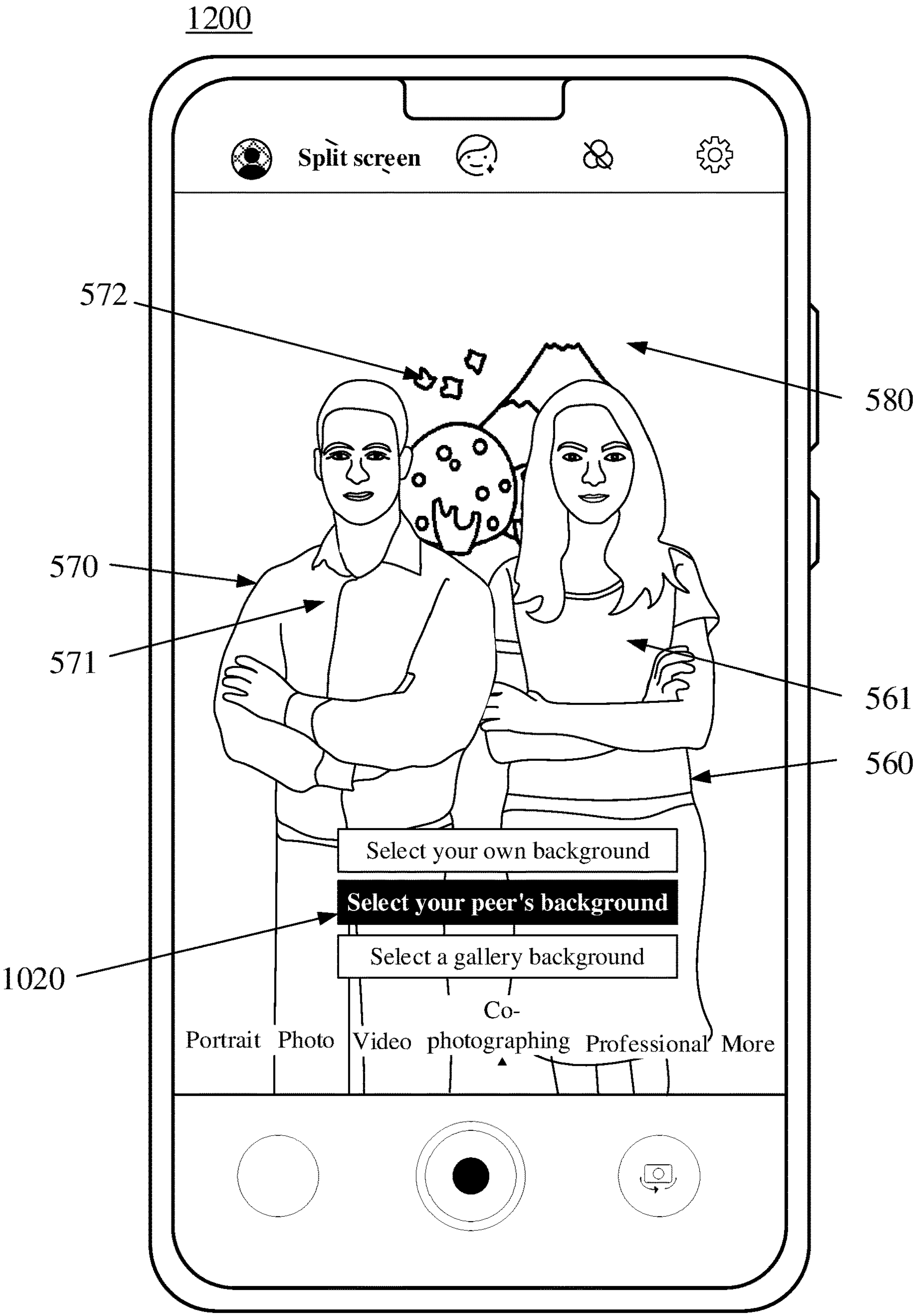
FIG. 12 is a schematic diagram of a structure of a user interface according to an embodiment of this application.

In an example, as shown in FIG. 10 and FIG. 12, the user interface may include a second user background control 1020.

The second user background control 1020 may indicate the electronic device to display the second background image 572 in the background image region. The electronic device may display the target gallery image 910 in the background interface region 580 in response to an operation performed by the user on the second user background control 1020. As shown in FIG. 12, the background interface region 580 may include pixels corresponding to the second background image 572. In some possible implementations, the electronic device may hide the second user background control 1020 in the user interface. For example, the electronic device may automatically hide the second user background control 1020 in the user interface, so that the second user background control 1020 does not block the first background image 562. Optionally, the electronic device may further hide the first user background control 1010 and the gallery background control 1030. Because the user has selected an appropriate background image, the electronic device may hide some controls, so that the user interface is simplified, and blocking of the controls on a preview video is reduced.

Because the synthesized target video may correspond to the user interface displayed by the electronic device, the electronic device may synthesize the first user image 561 in the first video, the first background image 562 in the first video, and the second user image 571 in the second video to obtain the target video, where a first image region of the target video may correspond to the first user image 561, a second image region of the target video may correspond to the second user image 571, and the background image region of the target video may correspond to the first background image 562.

Figure 13:
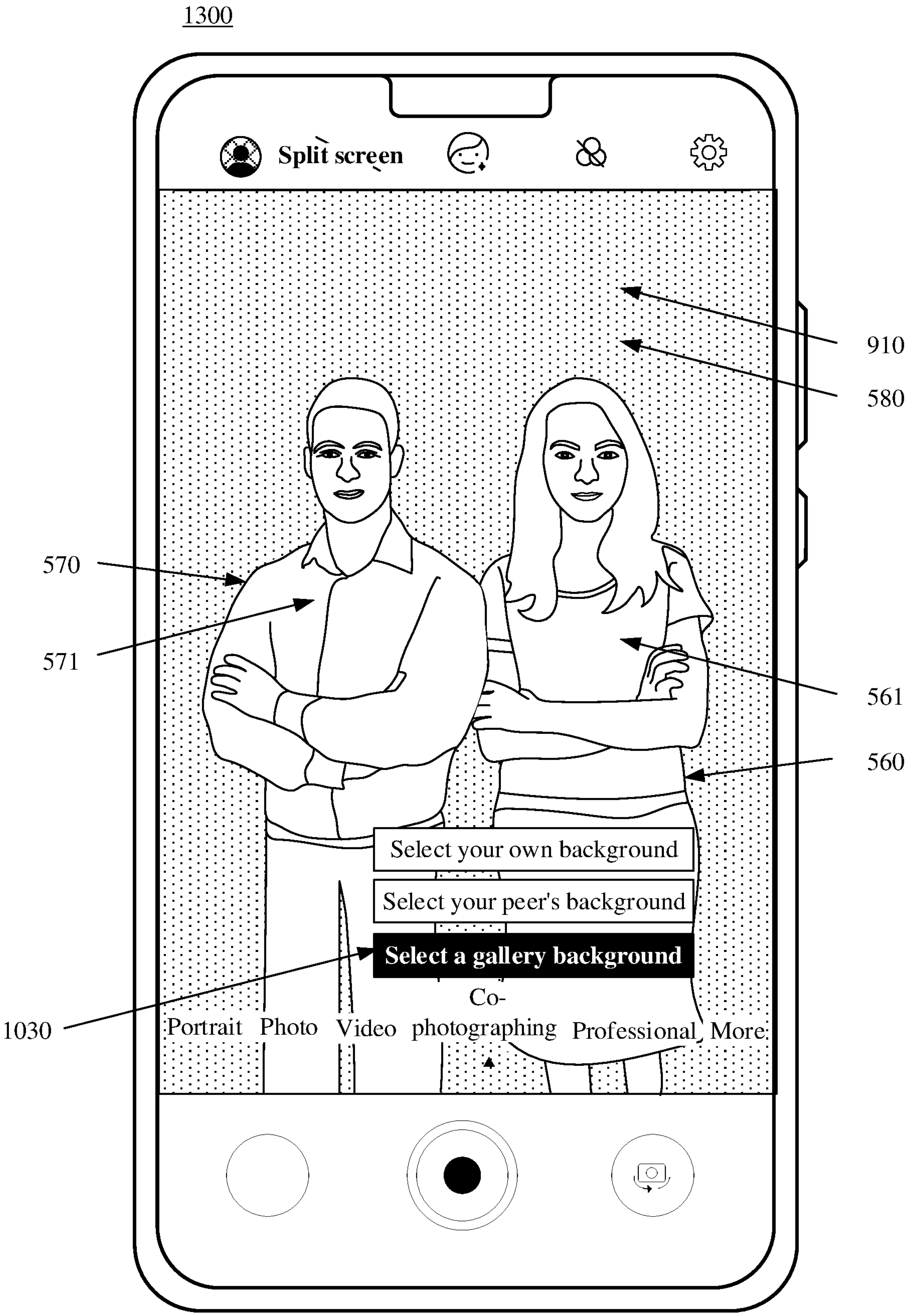
FIG. 13 is a schematic diagram of a structure of a user interface according to an embodiment of this application.

In an example, as shown in FIG. 10 and FIG. 13, the user interface may include a gallery background control 1030.

The gallery background control 1030 indicates the electronic device to obtain the target gallery image 910 from the gallery. The electronic device may display the target gallery image 910 in the background interface region 580 in response to an operation performed by the user on the gallery background control 1030. As shown in FIG. 13, the background interface region 580 may include pixels corresponding to the target gallery image 910. The target gallery image 910 may be a subframe of the video. In some possible implementations, the electronic device may hide the gallery background control 1030 in the user interface. For example, the electronic device may automatically hide the gallery background control 1030 in the user interface, so that the gallery background control 1030 does not block the first background image 562. Optionally, the electronic device may further hide the first user background control 1010 and the second user background control 1020. Because the user has selected an appropriate background image, the electronic device may hide some controls, so that the user interface is simplified, and blocking of the controls on a preview video is reduced.

Because the synthesized target video may correspond to the user interface displayed by the electronic device, the electronic device may synthesize the first user image 561 in the first video, the second user image 571 in the second video, and the second background image 572 in the second video to obtain the target video, where a first image region of the target video may correspond to the first user image 561, the second image region of the target video may correspond to the second user image 571, and the background image region of the target video may correspond to the second background image 572.

After remote co-photographing is completed, the user interface may display a video call decline control (not shown in FIG. 3 to FIG. 13). The electronic device may decline a video call between the first user and the second user in response to an operation (for example, a tap operation) performed by the user on the video call decline control. In this way, the first user may implement a video call and remote co-photographing with the second user by using a camera application.

The electronic device may invoke a target video in response to an operation performed by the user on a gallery application, so that the user can watch the target video. The electronic device may perform subsequent adjustment on the target video in response to an operation performed by the user on the gallery application, for example, may adjust a playback speed of the first image region, a playback speed of the second image region, beautification of the first image region, beautification of the second image region, a size of the first image region, and a size of the second image region.

Figure 14:
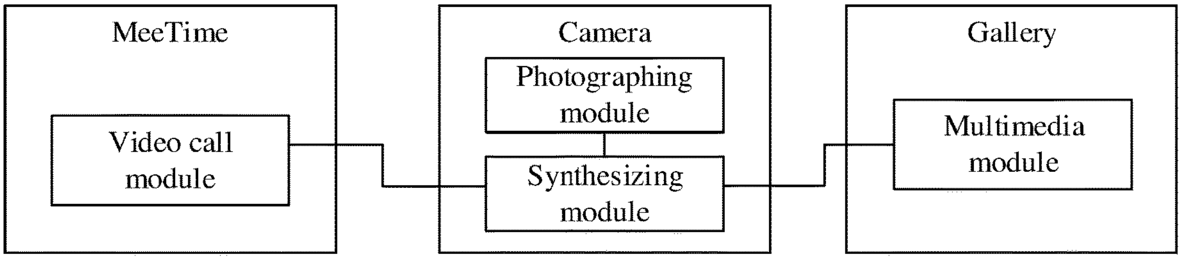
FIG. 14 is a relationship diagram of an application module according to an embodiment of this application.

FIG. 14 is a relationship diagram of an application module according to an embodiment of this application. A camera application shown in FIG. 14 may correspond to, for example, the camera application shown in FIG. 2. A MeeTime application shown in FIG. 14 may correspond to, for example, the MeeTime application shown in FIG. 2. A gallery application shown in FIG. 14 may correspond to, for example, the gallery application shown in FIG. 2.

The camera application may include a photographing module. In an example, the photographing module may be configured to photograph a scene in which a first user is shown, to obtain a first video. In another example, the photographing module may be configured to photograph a scene in which a second user is shown, to obtain a second video.

The MeeTime application may include a video call module. In an example, the video call module may be configured to: send the first video to a second electronic device, and obtain the second video from the second electronic device, where the second electronic device is an electronic device of the second user. In another example, the video calling module may be configured to: send the second video to a first electronic device, and obtain the first video from the first electronic device, where the first electronic device is an electronic device of the first user.

The camera application may further include a synthesizing module. The synthesizing module may obtain a target video through synthesizing based on the first video and the second video.

The gallery application may include a multimedia module. The multimedia module can invoke the target video and perform post-processing on the target video.

According to the solution provided in this embodiment of this application, photographing may be implemented by using the camera application, and a video call may be implemented by invoking the MeeTime application of the electronic device by using the camera application, to implement synchronous remote co-photographing. Because the video call may facilitate discussion and communication between a plurality of users, it is helpful to improve a matching degree of co-photographing of the plurality of users. After the video call is hung up, a co-photographing picture or a co-photographing video with a good co-photographing effect can be obtained, to help reduce a workload of the user in a co-photographing process, for example, a workload of post-retouching. When call quality is good (for example, when a signal of an electronic device is good), definition of the co-photographing image or the co-photographing video may be high.

Figure 15:
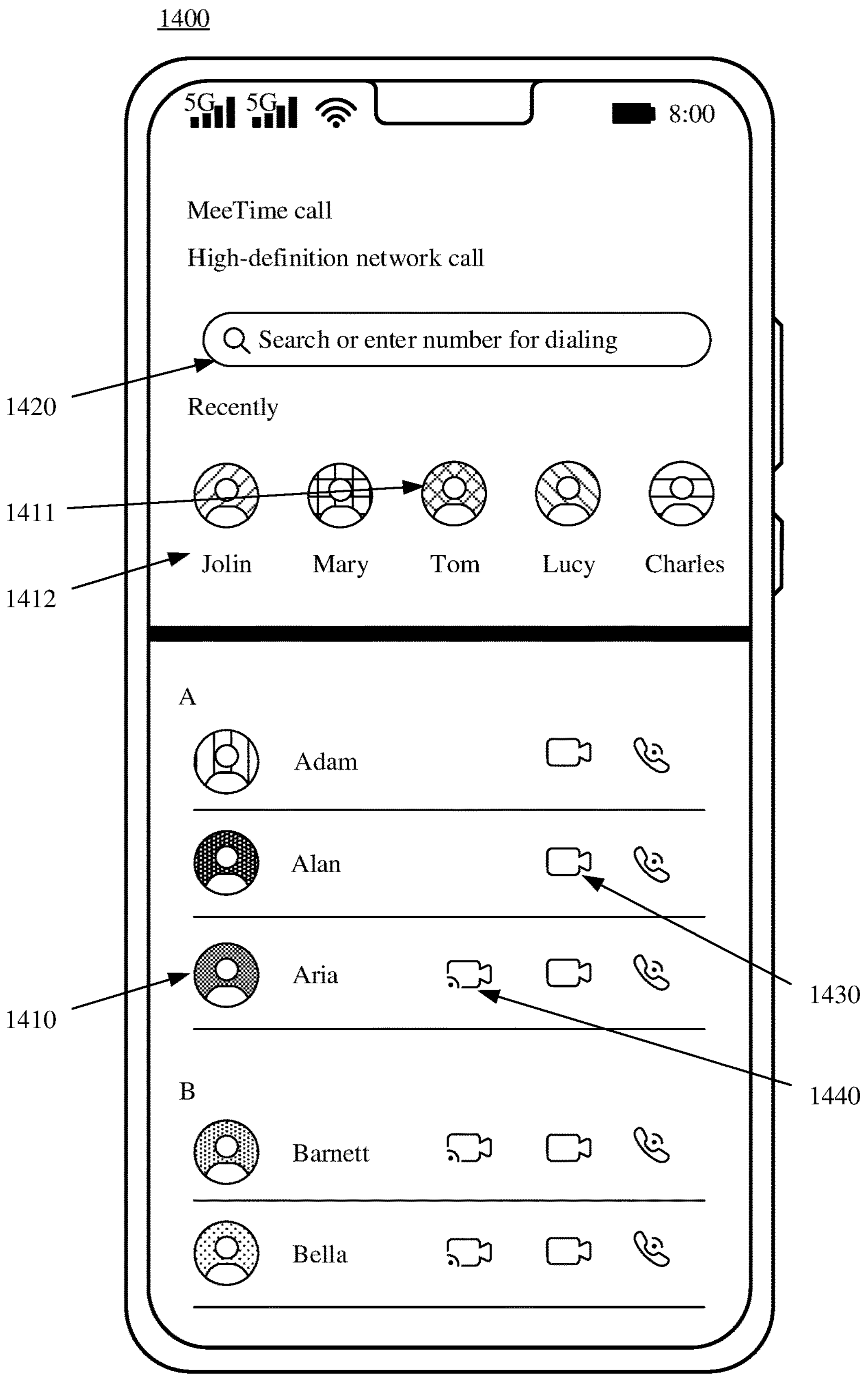
FIG. 15 is a schematic diagram of a structure of a user interface according to an embodiment of this application.

FIG. 15 is another schematic diagram of a user interface 1400 according to an embodiment of this application. The user interface 1400 may be displayed on a first electronic device. The user interface 1400 may be an interface of a MeeTime application, or an interface of another application having a video call function. In other words, the first electronic device carries the MeeTime application or the another application having the video call function. The first electronic device may display the user interface 1400 in response to an operation performed by a first user on these applications.

For example, the first user may tap an icon of the MeeTime application to open the MeeTime application, so that the first electronic device can display the user interface 1400.

Figure 16:
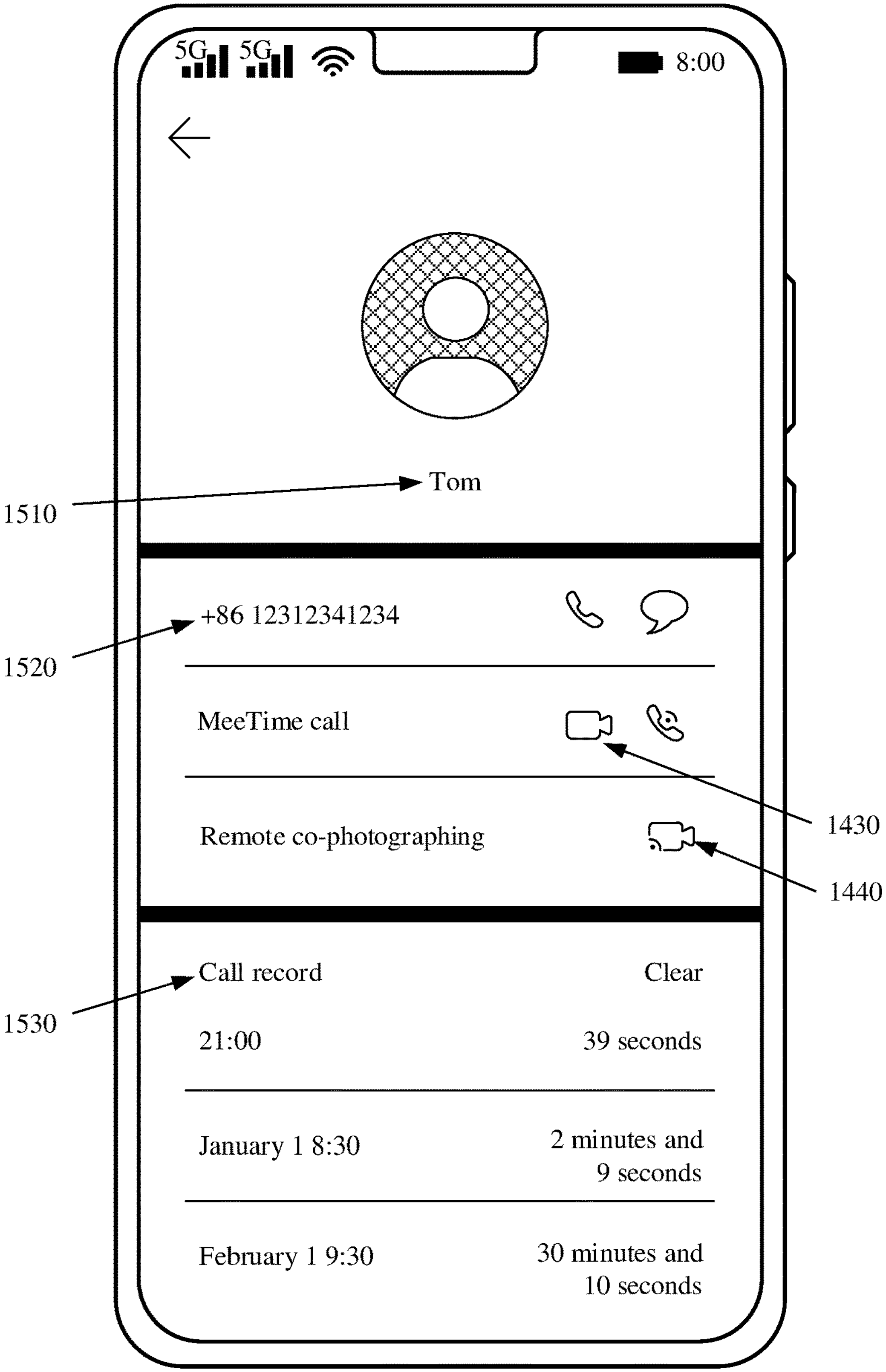
FIG. 16 is a schematic diagram of a structure of a user interface according to an embodiment of this application.

The user interface 1400 may include a plurality of user controls 1410 that are in a one-to-one correspondence with a plurality of users. The plurality of users may include a second user. The first electronic device may display, in response to an operation (for example, a tap operation) performed by the first user on the second user control 1410, contact information of the second user in a user interface 1500 shown in FIG. 16. As shown in FIG. 16, the contact information of the second user may include at least one of the following: a name 1510 of the second user, a contact method 1520 of the second user, a call record 1530 of the second user, and the like.

As shown in FIG. 15, the user interface 1400 may include a user search control 1420. In an example, the first user may invite, by using the user search control 1420, the second user to make a video call. The first electronic device may obtain related information of the second user (for example, a part or all of a name of the second user, an initial letter of the name of the second user, and a part or all of a video call number of the second user) in response to an operation (for example, a tap operation) performed by the first user on the user search control 1420 and a series of subsequent operations (for example, text input, voice input, and two-dimensional code scanning). The first electronic device may determine, based on the related information of the second user, a user record of the second user from a plurality of user records stored in the first electronic device, where the plurality of user records may be in a one-to-one correspondence with the plurality of users. In this way, the first electronic device can quickly display a user control of the second user in the user interface 1400.

Optionally, the user interface 1400 may include a frequently-used user control 1412. As shown in FIG. 15, the second user may be a frequent contact, and the user interface 1400 may include a frequently-used user control 1411 corresponding to the second user.

In an example, the first electronic device may collect statistics on a user with a largest quantity of times of co-photographing as a user A, and display a frequently-used user control A in the user interface 1400, where the frequently-used user control A may be a control corresponding to the user A. In another example, the first electronic device may collect statistics on a user with a largest quantity of times of video calls as a user B, and display a frequently-used user control B in the user interface 1400, where the frequently-used user control B may be a control corresponding to the user B.

Optionally, the plurality of users may be, for example, arranged in alphabetical order, to help the first user quickly search for the second user.

As shown in FIG. 15 and FIG. 16, the user interface may include a MeeTime video control 1430. As shown in FIG. 15, the user interface 1400 may include a plurality of MeeTime video controls 1430 that are in a one-to-one correspondence with the plurality of users. As shown in FIG. 16, the user interface 1500 may include a MeeTime video control 1430 corresponding to the second user.

Figure 17:
FIG. 17 is a schematic diagram of a structure of a user interface according to an embodiment of this application.

The first user may invite, through the first electronic device, the second user to make a video call. With reference to FIG. 15 to FIG. 17, the first electronic device may initiate a video call to the second electronic device in response to an operation (for example, a tap operation) performed by the first user on the MeeTime video control 1430 corresponding to the second user, where the second electronic device may be an electronic device used by the second user. The first electronic device may display, for example, a video call interface 1600 shown in FIG. 17.

Correspondingly, the second user may receive the video call invitation of the first user through the second electronic device. The second electronic device may display a video call invitation interface, where the interface may include a video call answer control. A video call connection may be established between the first electronic device and the second electronic device in response to an operation performed by the second user on the video call answer control. The first electronic device may display, for example, a user interface 1700 shown in FIG. 18.

After the first electronic device establishes a video call connection to the second electronic device, the first electronic device may obtain a first video through photographing, and the second electronic device may obtain a second video through photographing. In addition, the first electronic device may obtain the second video through the video call connection, and the second electronic device may obtain the first video through the video call connection.

Figure 18:
FIG. 18 is a schematic diagram of a structure of a user interface according to an embodiment of this application.

In an example, as shown in FIG. 18, the first user may invite the second user to perform remote co-photographing in a video call process. In another example, the second user may invite the first user to perform remote co-photographing in a video call process. After both the first user and the second user authorize the remote co-photographing, the first electronic device and the second electronic device may display a user interface 1800 shown in FIG. 19. The user interface 1800 may be a preparation interface for remote co-photographing.

Optionally, the user interface shown in FIG. 15 or FIG. 16 may further include a remote co-photographing control 1440. As shown in FIG. 15, the user interface 1400 may include a plurality of remote co-photographing controls 1440 that are in a one-to-one correspondence with a plurality of users. As shown in FIG. 16, the user interface 1500 may include a remote co-photographing control 1440 corresponding to the second user.

The first user may invite, by using the remote co-photographing control 1440, the second user to complete remote co-photographing through a video call. With reference to FIG. 15 to FIG. 17, in response to an operation (for example, a tap operation) performed by the first user on the remote co-photographing control 1440, the first electronic device may initiate a video call to the second electronic device, and send indication information to the second electronic device, where the indication information is used to invite the second user to perform co-photographing, and the second electronic device may be an electronic device used by the second user. The first electronic device may display, for example, a video call interface 1600 shown in FIG. 17.

Correspondingly, the second user may receive the remote co-photographing invitation of the first user through the second electronic device. The second electronic device may display a remote co-photographing invitation interface, where the interface may include a video call answer control. A video call connection may be established between the first electronic device and the second electronic device in response to an operation performed by the second user on the video call answer control. In addition, both the first electronic device and the second electronic device may display a user interface 1800 shown in FIG. 19.

Figure 19:
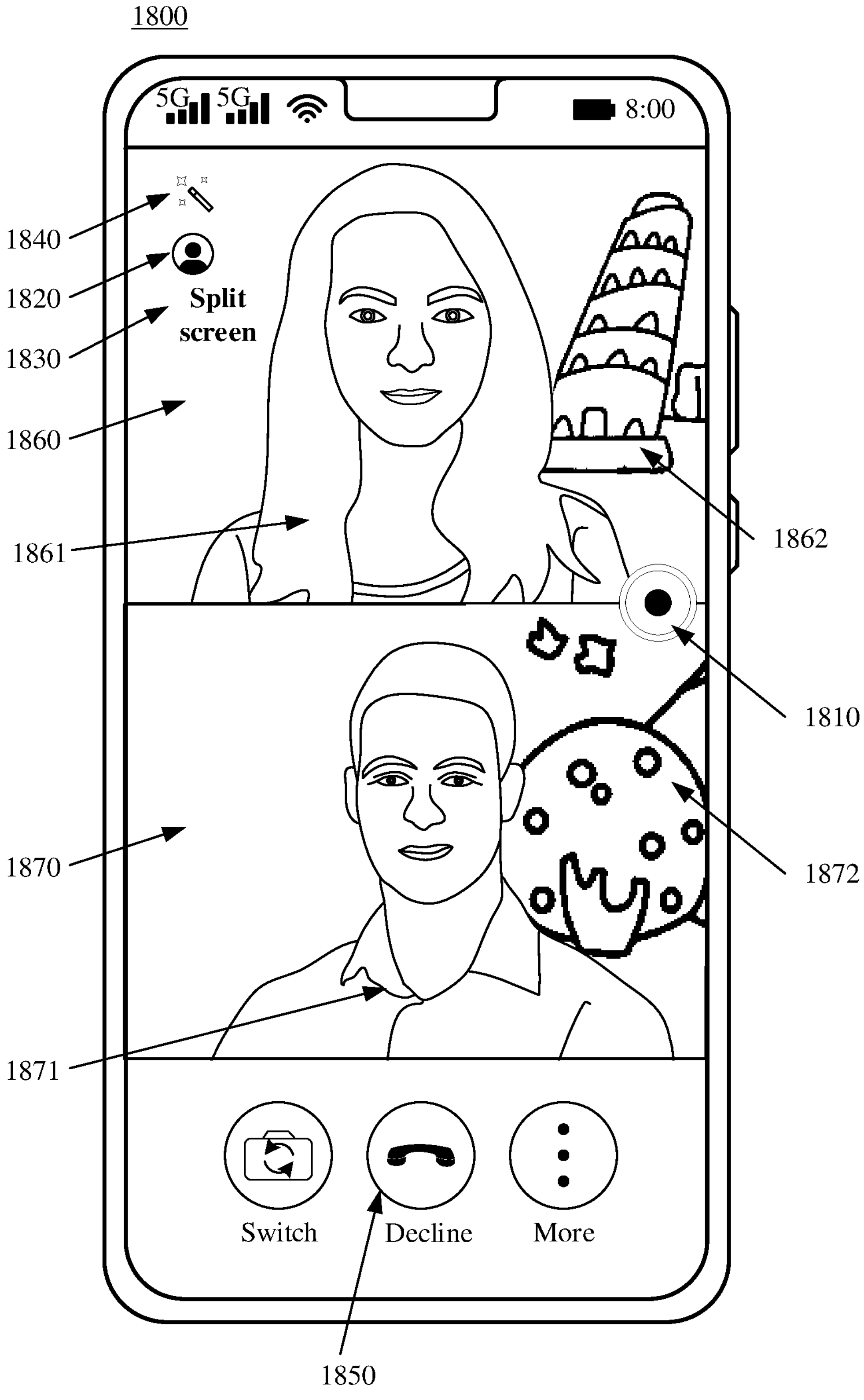
FIG. 19 is a schematic diagram of a structure of a user interface according to an embodiment of this application.

As shown in FIG. 19, the user interface 1800 may include a first interface region 1860 and a second interface region 1870, the first interface region 1860 may display a part or all of an image currently shot by the first electronic device, and the second interface region 1870 may display a part or all of an image currently shot by the second electronic device. The first interface region 1860 and the second interface region 1870 may not cross each other. The first interface region 1860 and the second interface region 1870 may be located at any location in the user interface 1800. As shown in FIG. 19, the first interface region 1860 may be located at an upper location in the user interface 1800, and the second interface region 1870 may be located at a lower location in the user interface 1800. In other words, both the part or all of the image shot by the first electronic device and the part or all of the image shot by the second electronic device may be displayed in the user interface 1800.

For example, as shown in FIG. 19, when the first user takes a selfie through a front-facing camera of the first electronic device, and the second user takes a selfie through a front-facing camera of the second electronic device, the first interface region 1860 may include a first user image 1861, and the second interface region 1870 may include a second user image 1871. In other words, the first interface region 1860 may include pixels corresponding to the first user, and the second interface region 1870 may include pixels corresponding to the second user. It should be understood that, in another example, the first electronic device and/or the second electronic device may use a rear-facing camera to shoot an image including a user.

The user interface 1800 may include a recording control 1810. The electronic device may synthesize, in response to an operation performed by the user on the recording control 1810, a first video shot by the first electronic device and a second video shot by the second electronic device, to obtain a target video. The target video includes a first image region and a second image region, the first image region corresponds to the first interface region 1860, and the second image region corresponds to the second interface region 1870. It can be learned with reference to the foregoing description that definition of the target video may be higher than display definition of the electronic device.

The user interface may further include a plurality of controls for adjusting a co-photographing effect. Before or during co-photographing, the user may use these controls to adjust the co-photographing effect. With reference to FIG. 19 to FIG. 27, the following describes some possible control examples provided in this application.

Optionally, as shown in FIG. 19, the user interface 1800 may include a beautification on/off control 1840. Refer to the embodiments shown in FIG. 3 to FIG. 13. The beautification on/off control 1840 may have functions of the beauty on/off control 540 and/or the filter on/off control 550 described above. Details are not described herein again.

Optionally, as shown in FIG. 19, the user interface 1800 may further include a background removal on/off control 1820. The background removal on/off control 1820 may indicate whether the electronic device removes a background of the first video and/or a background of the second video.

When the background removal on/off control 1820 is on, the electronic device may display the user interface 1800. The user interface 1800 may include a first user background control, a second user background control, and a gallery background control.

As shown in FIG. 19, the background removal on/off control 1820 may be currently off. The first interface region 1860 may display the first user image 1861 and a first background image 1862, and the second interface region 1870 may display the second user image 1871 and a second background image 1872. The first background image 1862 may be a background image of the first user. The second background image 1872 may be a background image of the second user. In other words, the first interface region 1860 may include pixels corresponding to the first user and pixels corresponding to a scene in which the first user is shown, and the second interface region 1870 may include pixels corresponding to the second user and pixels corresponding to a scene in which the second user is shown.

Figure 20:
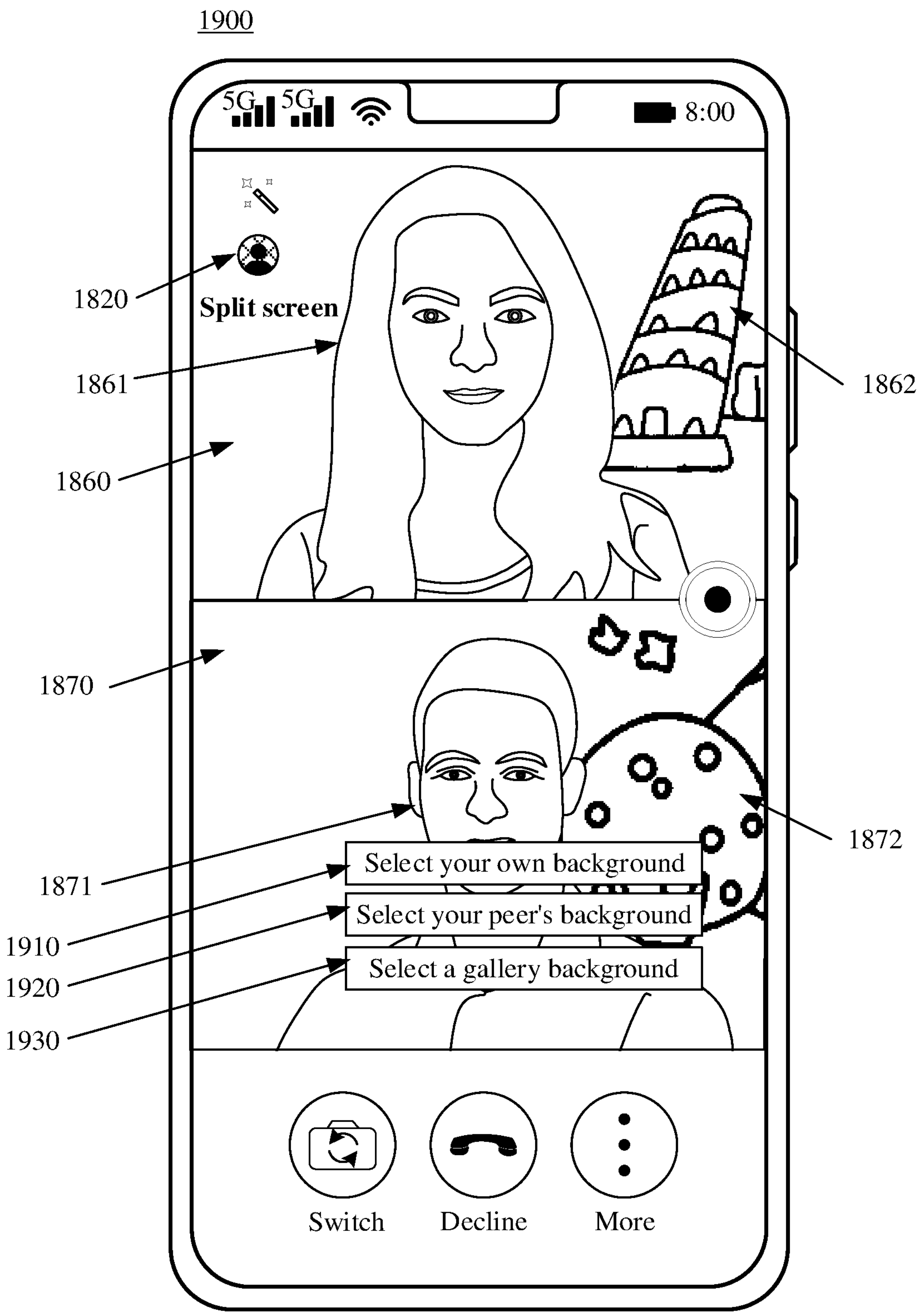
FIG. 20 is a schematic diagram of a structure of a user interface according to an embodiment of this application.

As shown in FIG. 20, when the background removal on/off control 1820 is on, the electronic device may display a user interface 1900. The user interface 1900 may include a first user background control 1910, a second user background control 1920, and a gallery background control 1930.

The first user background control 1910 indicates the electronic device to display the first background image 1862 in both the first interface region 1860 and the second interface region 1870.

Figure 21:
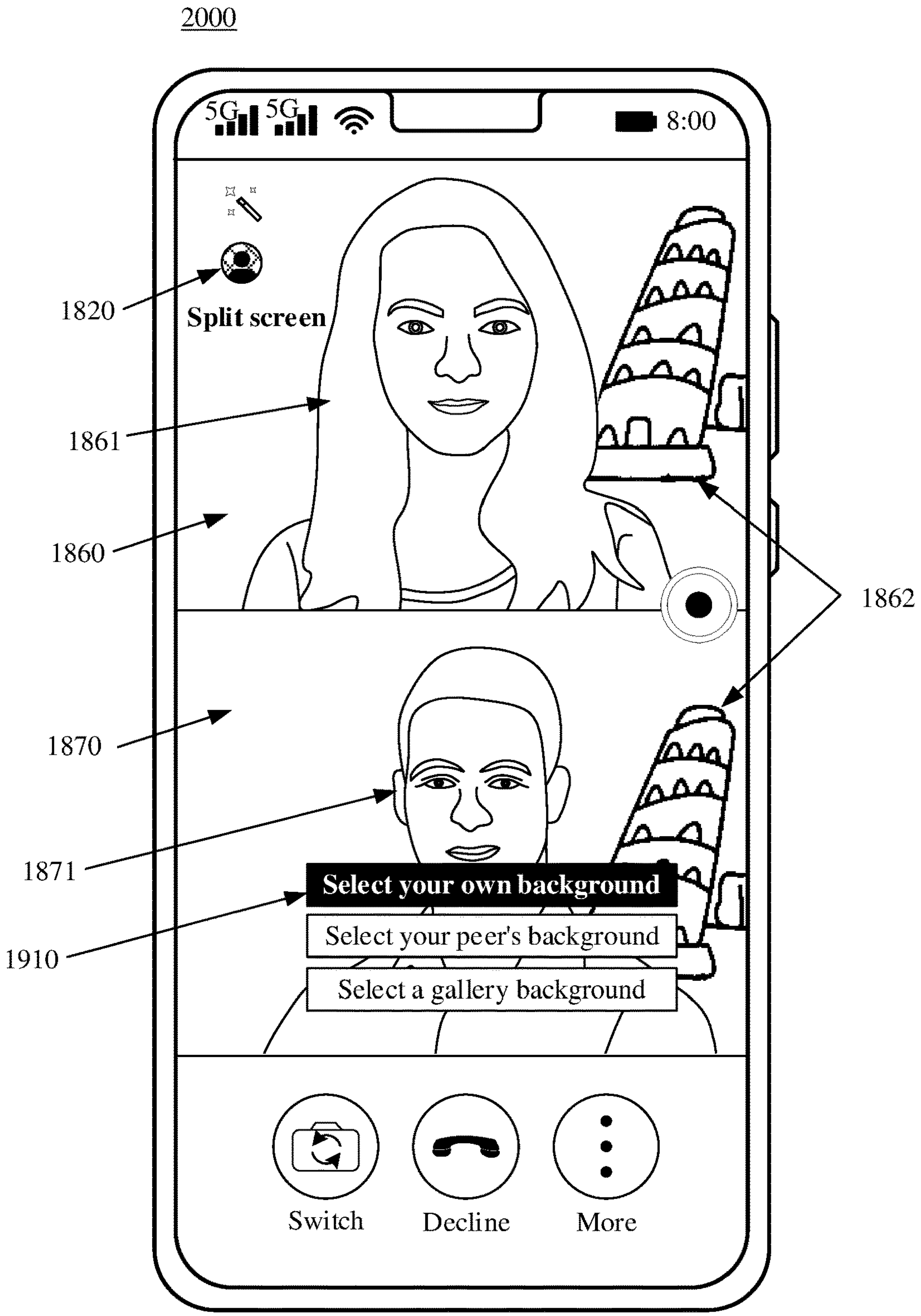
FIG. 21 is a schematic diagram of a structure of a user interface according to an embodiment of this application.

As shown in a user interface 2000 in FIG. 21, the first interface region 1860 may display a first video shot by the first electronic device, where the first video may include the first user image 1861 and the first background image 1862, and the first background image 1862 includes image information of the scene in which the first user is shown. The second user image 1871 and the first background image 1862 are displayed in the second interface region 1870, and the second user image 1871 may be a part of a second video shot by the second electronic device. The second interface region 1870 may not display the second background image 1872 shown in FIG. 19 or FIG. 20. To be specific, the second interface region 1870 may not include pixels corresponding to the scene in which the second user is shown.

The electronic device may obtain a target video by synthesizing the first user image 1861 in the first video, the first background image 1862 in the first video, and the second user image 1871 in the second video, where a first image region of the target video may correspond to the first user image 1861 and the first background image 1862, and a second image region of the target video may correspond to the second user image 1871 and the first background image 1862.

For example, the electronic device may obtain the first video and the second video in the foregoing manner; the electronic device may determine the first background image 1862 based on the first video; the electronic device may synthesize the first background image 1862 and the second user image 1871 to obtain a third video; the electronic device may display the first video in the first interface region 1860, and display the third video in the second interface region 1870; and the electronic device may synthesize the first video and the third video into the target video, where the first video corresponds to the first image region of the target video, and the third video corresponds to the second image region of the target video.

The second user background control 1920 may indicate the electronic device to display the second background image 1872 in both the second interface region 1870 and the second interface region 1870.

Figure 22:
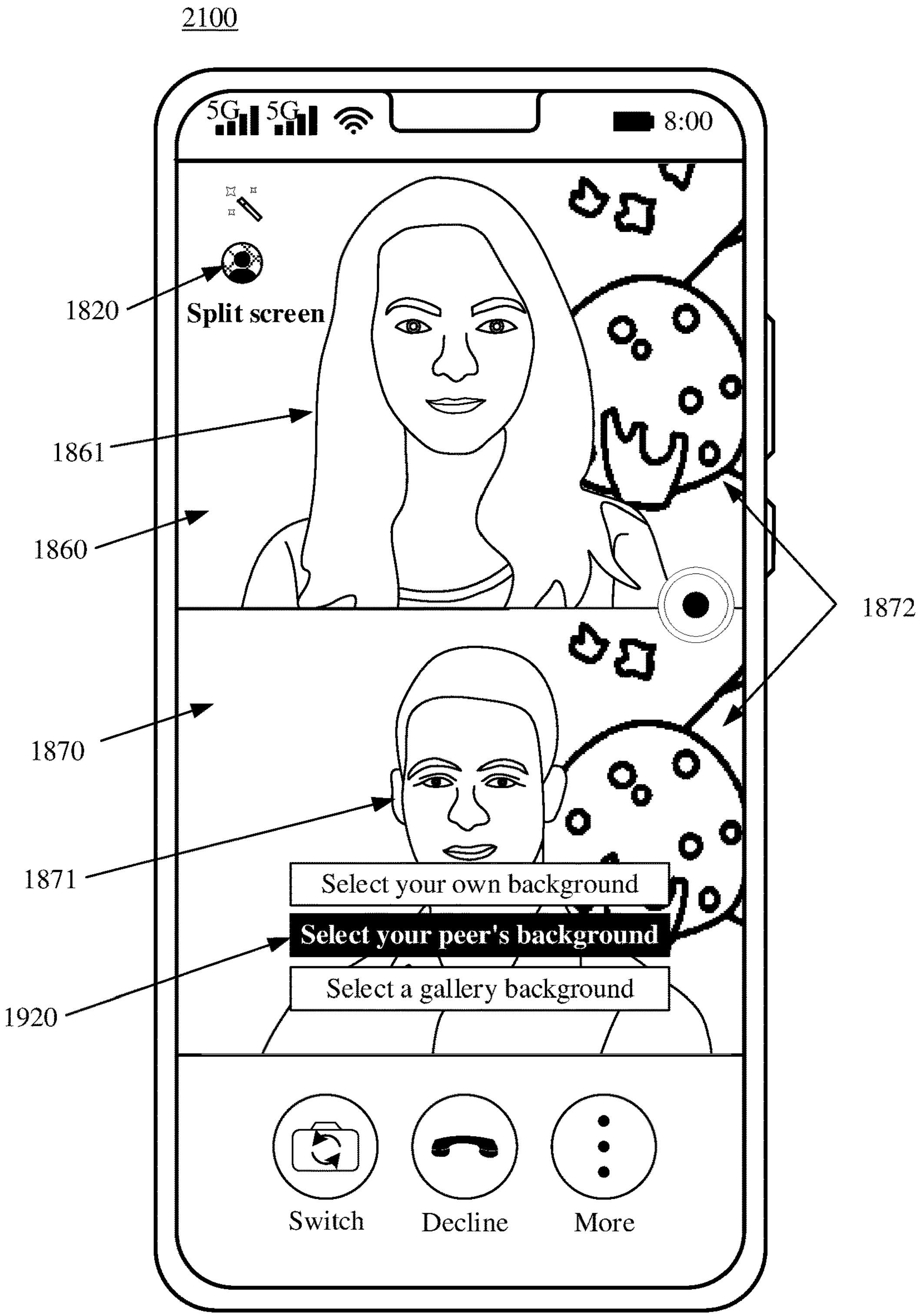
FIG. 22 is a schematic diagram of a structure of a user interface according to an embodiment of this application.

As shown in a user interface 2100 in FIG. 22, the second interface region 1870 may display a second video shot by the second electronic device, where the second video may include the second user image 1871 and the second background image 1872, and the second background image 1872 includes image information of the scene in which the second user is shown. The first interface region 1860 displays the first user image 1861 and the second background image 1872, and the first user image 1861 may be a part of a first video shot by the first electronic device. The first interface region 1860 may not display the first background image 1862 shown in FIG. 19 or FIG. 20. In other words, the first interface region 1860 may not include pixels corresponding to the scene in which the first user is shown.

The electronic device may obtain a target video by synthesizing the first user image 1861 in the first video, the second user image 1871 in the second video, and the second background image 1872 in the second video, where a first image region of the target video may correspond to the first user image 1861 and the second background image 1872, and a second image region of the target video may correspond to the second user image 1871 and the second background image 1872.

For example, the electronic device may obtain the first video and the second video in the foregoing manner; the electronic device may determine the second background image 1872 based on the second video; the electronic device may synthesize the second background image 1872 and the first user image 1861 to obtain a fourth video; the electronic device may display the fourth video in the first interface region 1860, and display the second video in the second interface region 1870; and the electronic device may synthesize the second video and the fourth video into the target video, where the fourth video corresponds to the first image region of the target video, and the second video corresponds to the second image region of the target video.

The gallery background control 1930 may indicate the electronic device to obtain a target gallery image 2210 from a gallery, and set the target gallery image 2210 as a background image. The target gallery image 2210 may be a subframe of the video. For example, when users take a co-photographing video, a subframe of the co-photographing video may correspond to the target gallery image 2210, and a plurality of subframes of the co-photographing video may be in a one-to-one correspondence with a plurality of subframes of a video in which the target gallery image 2210 is located.

Figure 23:
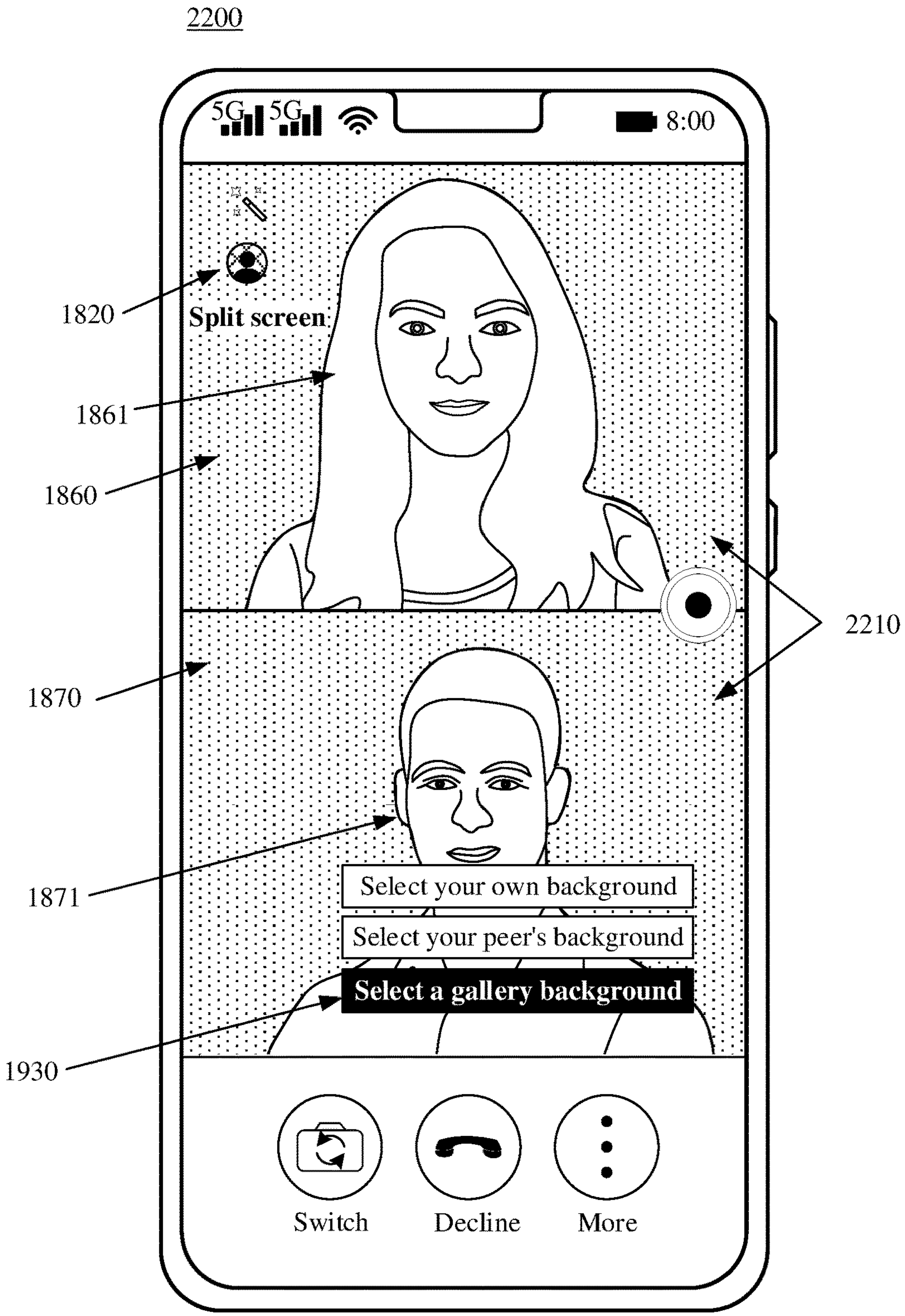
FIG. 23 is a schematic diagram of a structure of a user interface according to an embodiment of this application.

As shown in a user interface 2200 in FIG. 23, the first interface region 1860 may display the first user image 1861 and the target gallery image 2210, and the first user image 1861 may be a part of a first video shot by the first electronic device. In other words, the first interface region 1860 may include pixels corresponding to the first user and pixels corresponding to the target gallery image 2210. The first interface region 1860 may not display the first background image 1862 shown in FIG. 19 or FIG. 20, and may not display the second background image 1872 shown in FIG. 22.

As shown in the user interface 2200 in FIG. 23, the second interface region 1870 may display the second user image 1871 and the target gallery image 2210, and the second user image 1871 may be a part of a second video shot by the second electronic device. In other words, the second interface region 1870 may include pixels corresponding to the second user and pixels corresponding to the target gallery image 2210. The second interface region 1870 may not display the second background image 1872 shown in FIG. 19 or FIG. 20, and may not display the first background image 1862 shown in FIG. 21.

In another example, the electronic device may display the target gallery image 2210 only in the first interface region 1860 or the second interface region 1870, to be used as a background image of the interface region.

The electronic device may obtain a target video by synthesizing the first user image 1861 in the first video, the second user image 1871 in the second video, and the target gallery image 2210, where a first image region of the target video may correspond to the first user image 1861 and the target gallery image 2210, and a second image region of the target video may correspond to the second user image 1871 and the target gallery image 2210.

For example, the electronic device may obtain the first video and the second video in the foregoing manner; the electronic device may determine the first user image 1861 based on the first video; the electronic device may determine the second user image 1871 based on the second video; the electronic device may synthesize the target gallery image 2210 and the first user image 1861 to obtain a fifth video; the electronic device may synthesize the target gallery image 2210 and the second user image 1871 to obtain a sixth video; the electronic device may display the fifth video in the first interface region 1860, and display the sixth video in the second interface region 1870; and the electronic device may synthesize the fifth video and the sixth video into the target video, where the fifth video corresponds to the first image region of the target video, and the sixth video corresponds to the second image region of the target video.

In an example, the user interfaces shown in FIG. 20 to FIG. 23 may be displayed on the first electronic device. In this case, "Select your own background" in FIG. 20 to FIG. 23 may correspond to the first user background control 1910, and "Select your peer's background" in FIG. 20 to FIG. 23 may correspond to the second user background control 1920. In another example, the user interfaces shown in FIG. 20 to FIG. 23 may be displayed on the second electronic device. In this case, "Select your own background" in FIG. 20 to FIG. 23 may correspond to the second user background control 1920, and "Select your peer's background" in FIG. 20 to FIG. 23 may correspond to the first user background control 1910.

Figure 24:
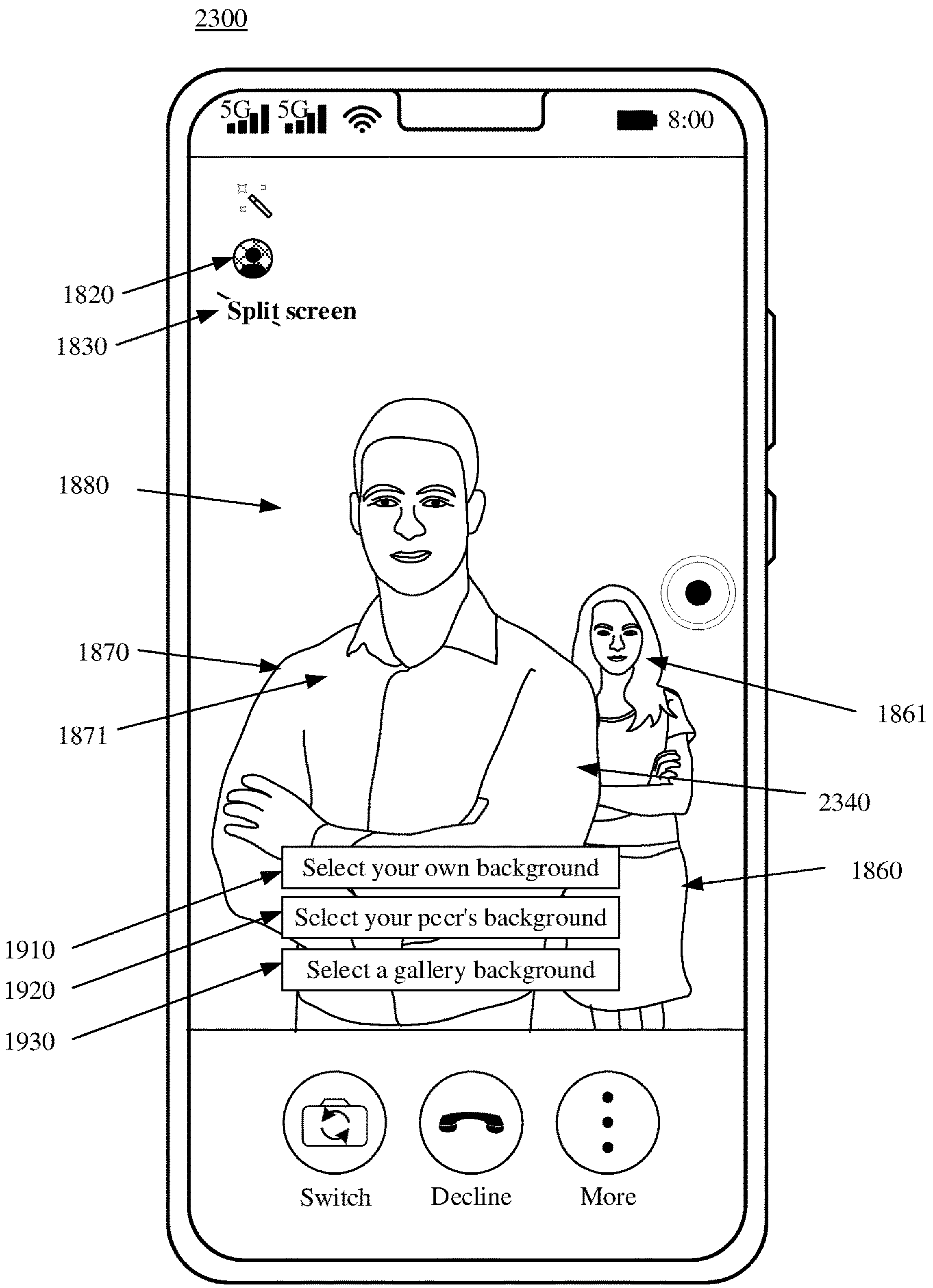
FIG. 24 is a schematic diagram of a structure of a user interface according to an embodiment of this application.

Optionally, as shown in FIG. 19 and FIG. 24, the user interface may further include a split-screen on/off control 1830.

As shown in the user interface 1800 in FIG. 19, when the split screen on/off control 1830 is on, the first interface region 1860 and the second interface region 1870 may be, for example, two regular display regions. To be specific, a contour of the first interface region 1860 may not match (or do not correspond to) the contour of the first user, and a contour of the second interface region 1870 may not match (or do not correspond to) the contour of the second user. An area of the first interface region 1860 and an area of the second interface region 1870 may correspond to, for example, a fixed ratio (for example, 1:1 or 1:1.5). In the example shown in FIG. 19, the split screen on/off control 1830 is currently on. Both the first interface region 1860 and the second interface region 1870 may be in a rectangular shape.

The electronic device may perform, in response to an operation performed by a user on the recording control 1810, an operation of synthesizing videos to obtain a target video, where a first image region and a second image region of the target video may be two regular display regions. A contour of the first image region may not match (or does not correspond to) the contour of the first user, and a contour of the second image region may not match (or does not correspond to) the contour of the second user. An area of the first image region and an area of the second image region may correspond to, for example, a fixed ratio (for example, 1:1 or 1:1.5). With reference to the example shown in FIG. 19, both the first image region and the second image region of the target video may be in a rectangular shape.

As shown in FIG. 24, when the split screen on/off control 1830 is off, a contour of the first interface region 1860 may match (or correspond to), for example, the contour of the first user, and a contour of the second interface region 1870 may match (or correspond to), for example, the contour of the second user. Optionally, when the split screen on/off control 1830 is off, the background removal on/off control 1820 may be off. In other words, the first interface region 1860 may not include the first background image 1862 in the first video shown in FIG. 19 or FIG. 20, and the second interface region 1870 may not include the second background image 1872 in the second video shown in FIG. 19 or FIG. 20.

Because the synthesized target video may correspond to a user interface displayed by the electronic device, the contour of the first image region may match (or correspond to) the contour of the first user, and the contour of the second image region may match (or correspond to) the contour of the second user. In other words, the first image region may not include the first background image 1862 in the first video shown in FIG. 19 or FIG. 20, and the second image region may not include the second background image 1872 in the second video shown in FIG. 19 or FIG. 20.

As shown in a user interface 2300 in FIG. 24, when a display conflict may exist between the first user image 1861 and the second user image 1871 in the user interface 2300, the electronic device may preferentially display the first user image 1861 or the second user image 1871. In other words, the first user image 1861 may cover the second user image 1871. In this case, a display priority of the first user image 1861 or the first interface region 1860 may be higher than a display priority of the second user image 1871 or the second interface region 1870. Alternatively, the second user image 1871 may cover the first user image 1861. In this case, a display priority of the first user image 1861 or the first interface region 1860 may be higher than a display priority of the second user image 1871 or the second interface region 1870.

For example, the electronic device may display the first user image 1861 in front of the second user image 1871 in response to an operation performed by the user on the first interface region 1860 or the second interface region 1870. In this case, the contour of the first interface region 1860 may be determined based on the first user image 1861, and the contour of the second interface region 1870 may be determined based on the second user image 1871 and a part that is of the first user image 1861 and that overlaps the second user image 1871. In a possible scene, the first interface region 1860 may display all pixels of the first user image 1861, and the second interface region 1870 may display only some pixels of the second user image 1871.

Because the synthesized target video may correspond to a user interface displayed by the electronic device, the contour of the first image region may be determined based on the first user image 1861, and the contour of the second image region may be determined based on the second user image 1871 and a part that is of the first user image 1861 and that overlaps the second user image 1871. The first image region may include all pixels corresponding to the first user image 1861, and the second image region may include only some pixels corresponding to the second user image 1871.

For another example, the electronic device may display the second user image 1871 in front of the first user image 1861, for example, at a location pointed by an arrow 2340 in FIG. 24, in response to an operation performed by the user on the second interface region 1870 or the first interface region 1860. In this case, the contour of the second interface region 1870 may be determined based on the second user image 1871, and the contour of the first interface region 1860 may be determined based on the first user image 1861 and a part that is of the second user image 1871 and that overlaps the first user image 1861. In a possible scene, the second interface region 1870 may display all pixels of the second user image 1871, and the first interface region 1860 may display only some pixels of the first user image 1861.

Because the synthesized target video may correspond to a user interface displayed by the electronic device, the contour of the second image region may be determined based on the second user image 1871, and the contour of the first image region may be determined based on the first user image 1861 and a part that is of the second user image 1871 and that overlaps the first user image 1861. The first image region may include only some pixels corresponding to the first user image 1861, and the second image region may include all pixels corresponding to the second user image 1871.

To reduce a workload of post-processing a video by the user, the user may adjust display sizes of the first user image 1861 and the second user image 1871, to adjust size percentages of the image of the first user and the image of the second user in the target video. As shown in FIG. 24, a display percentage of the second user image 1871 in the user interface 2300 may be greater than a display percentage of the first user image 1861 in the user interface 2300.

For example, the user may perform a scaling operation in the first interface region 1860. The electronic device may scale up or down the first interface region 1860 in response to the scaling operation performed by the user on the first interface region 1860. Because the contour of the first interface region 1860 matches the contour of the first user image 1861, a display percentage of the first user image 1861 in the user interface 2300 may be adjusted. Correspondingly, an image percentage of the first image region in the target video may be adjusted.

For another example, the user may perform a scaling operation in the second interface region 1870. The electronic device may scale up or down the second interface region 1870 in response to the scaling operation performed by the user on the second interface region 1870. Because the contour of the second interface region 1870 matches the contour of the second user image 1871, a display percentage of the second user image 1871 in the user interface 2300 may be adjusted. Correspondingly, an image percentage of the second image region in the target video may be adjusted.

For another example, the user may perform a scaling operation in the user interface 2300. The electronic device may adjust display percentages of the first interface region 1860 and the second interface region 1870 in the user interface 2300 in response to the scaling operation performed by the user in the user interface 2300. Correspondingly, both image percentages of the first image region and the second image percentage in the target video may be adjusted. In other words, the electronic device may have a capability of adjusting sizes of a plurality of user images at a time.

A display percentage of the first interface region 1860 in the user interface may be a first display percentage, and a display percentage of the second interface region 1870 in the user interface may be a second display percentage. The display percentage of the interface region in the user interface may be understood as a percentage of a quantity of pixels in the interface region in a quantity of pixels in the user interface.

In a possible example, after the electronic device adjusts the display percentages of the first interface region 1860 and the second interface region 1870 in the user interface, the first display percentage and the second display percentage may be the same or approximately the same. For example, a quantity of pixels included in the first interface region 1860 is the same as or slightly different from a quantity of pixels included in the second interface region 1870. In this display manner, display percentages of a plurality of user images in the user interface may not differ greatly. This display manner is more applicable to a scene in which there are a large quantity of co-photographing users, and helps reduce a workload of adjusting the display percentages of the user images one by one by the user.

In another possible example, a percentage of the first user image 1861 in the first video may be a first image percentage (in a frame of a video image, an image percentage may be a percentage of a quantity of pixels of a user image in a total quantity of pixels of the frame), a percentage of the second user image 1871 in the second video may be a second image percentage, a ratio of the first display percentage to the first image percentage (when a ratio of a display percentage to an image percentage is 1, it may be understood that the electronic device displays a user image based on an original size of the user image in a video) may be a first ratio, and a ratio of the second display percentage to the second image percentage may be a second ratio. After the electronic device adjusts the display percentages of the first interface region 1860 and the second interface region 1870 in the user interface, the first ratio may be the same as the second ratio.

For example, as shown in FIG. 24, the second user image 1871 accounts for a large proportion of the second video, and the first user image 1861 accounts for a small proportion of the first video. In this case, a proportion of the second user image 1871 in the user interface 2300 may be greater than a proportion of the first user image 1861 in the second video. This display manner may be closer to display of an original video. The user may adjust, in a manner of approaching a camera or moving away from a camera, a size of the user in the user interface and the target video obtained through the co-photographing. Pixels of the original video can be basically restored to the target video obtained through the co-photographing, which helps improve definition of the co-photographing video. In the example shown in FIG. 24, a display percentage of the user image in the user interface 2300 during co-photographing may match a display percentage of the user image in the user interface 2300 during the selfie. This helps the user more easily adapt to the co-photographing method provided in this embodiment of this application.

As shown in FIG. 24, the user interface 2300 may further include a background interface region 1880. In the example shown in FIG. 24, pixels in the background interface region 1880 may be, for example, a default value (for example, considered as gray or white by default). Optionally, the background interface region 1880 may display any one of the first background image 1862, the second background image 1872, and the target gallery image 2210. Correspondingly, the target video may include a background image region. The background image region may correspond to any one of the first background image 1862, the second background image 1872, and the target gallery image 2210.

Figure 25:
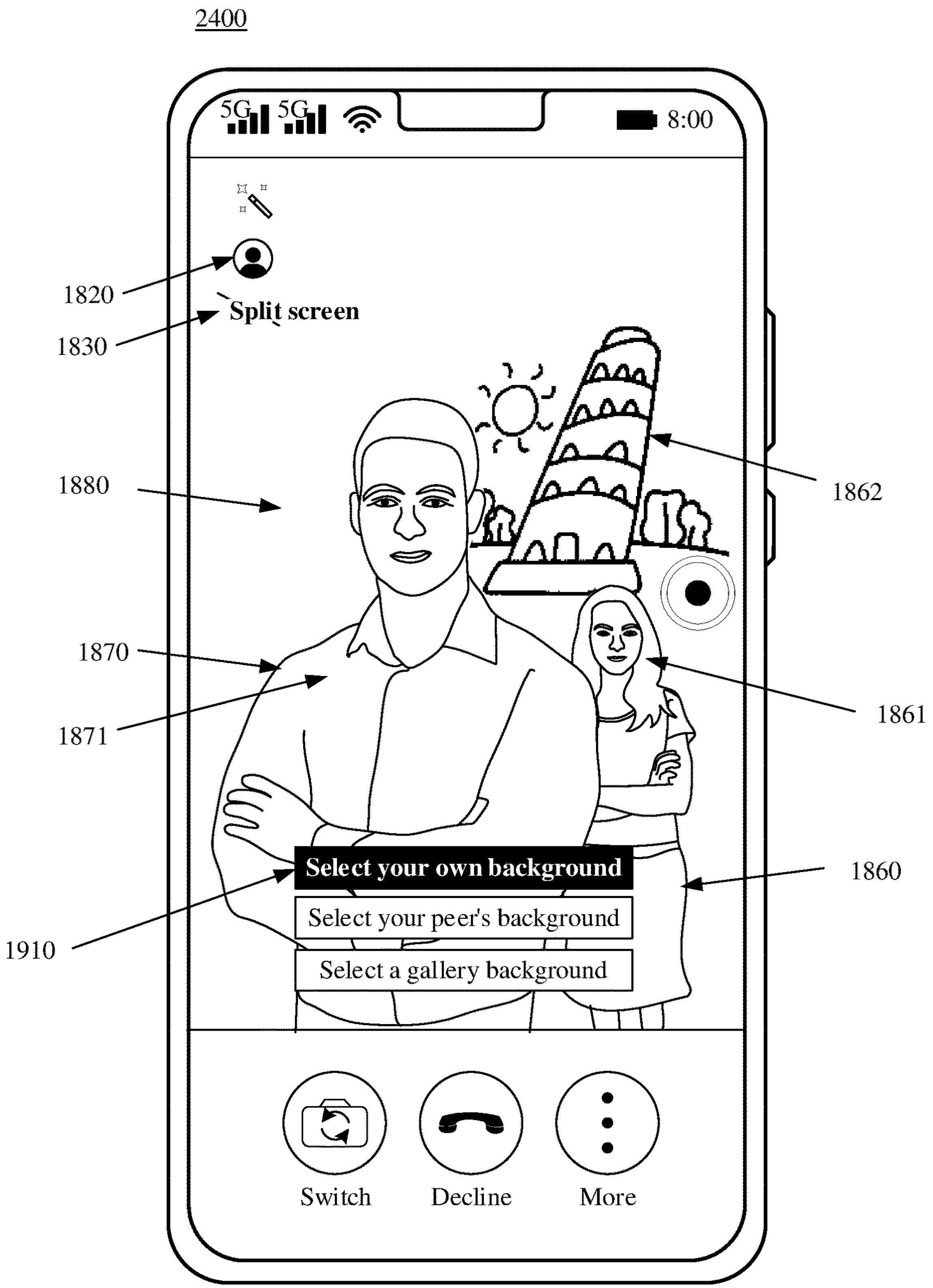
FIG. 25 is a schematic diagram of a structure of a user interface according to an embodiment of this application.

In an example, as shown in FIG. 24 and FIG. 25, the user interface may include a first user background control 1910.

The first user background control 1910 may indicate the electronic device to display the first background image 1862 in the background image region. The electronic device may display the target gallery image 2210 in the background interface region 1880 in response to an operation performed by the user on the first user background control 1910. As shown in FIG. 25, the background interface region 1880 may include pixels corresponding to the first background image 1862.

Because the synthesized target video may correspond to the user interface displayed by the electronic device, the electronic device may synthesize the first user image 1861 in the first video, the second user image 1871 in the second video, and the target gallery image 2210 to obtain the target video, where a first image region of the target video may correspond to the first user image 1861, a second image region of the target video may correspond to the second user image 1871, and a background image region of the target video may correspond to the target gallery image 2210.

Figure 26:
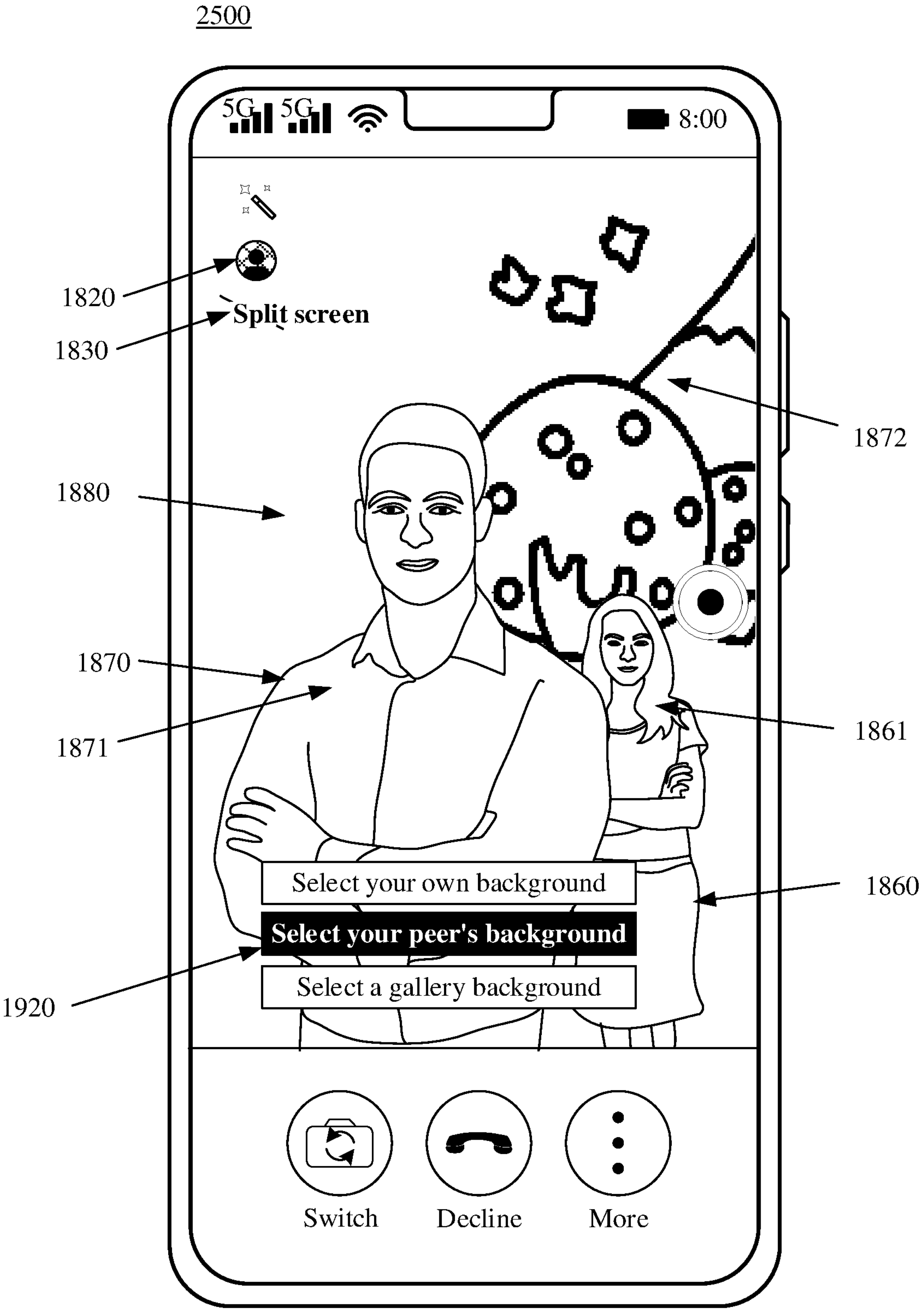
FIG. 26 is a schematic diagram of a structure of a user interface according to an embodiment of this application.

In an example, as shown in FIG. 24 and FIG. 26, the user interface may include a second user background control 1920.

The second user background control 1920 may indicate the electronic device to display the second background image 1872 in the background image region. The electronic device may display the target gallery image 2210 in the background interface region 1880 in response to an operation performed by the user on the second user background control 1920. As shown in FIG. 26, the background interface region 1880 may include pixels corresponding to the second background image 1872.

Because the synthesized target video may correspond to the user interface displayed by the electronic device, the electronic device may synthesize the first user image 1861 in the first video, the first background image 1862 in the first video, and the second user image 1871 in the second video to obtain the target video, where a first image region of the target video may correspond to the first user image 1861, a second image region of the target video may correspond to the second user image 1871, and the background image region of the target video may correspond to the first background image 1862.

Figure 27:
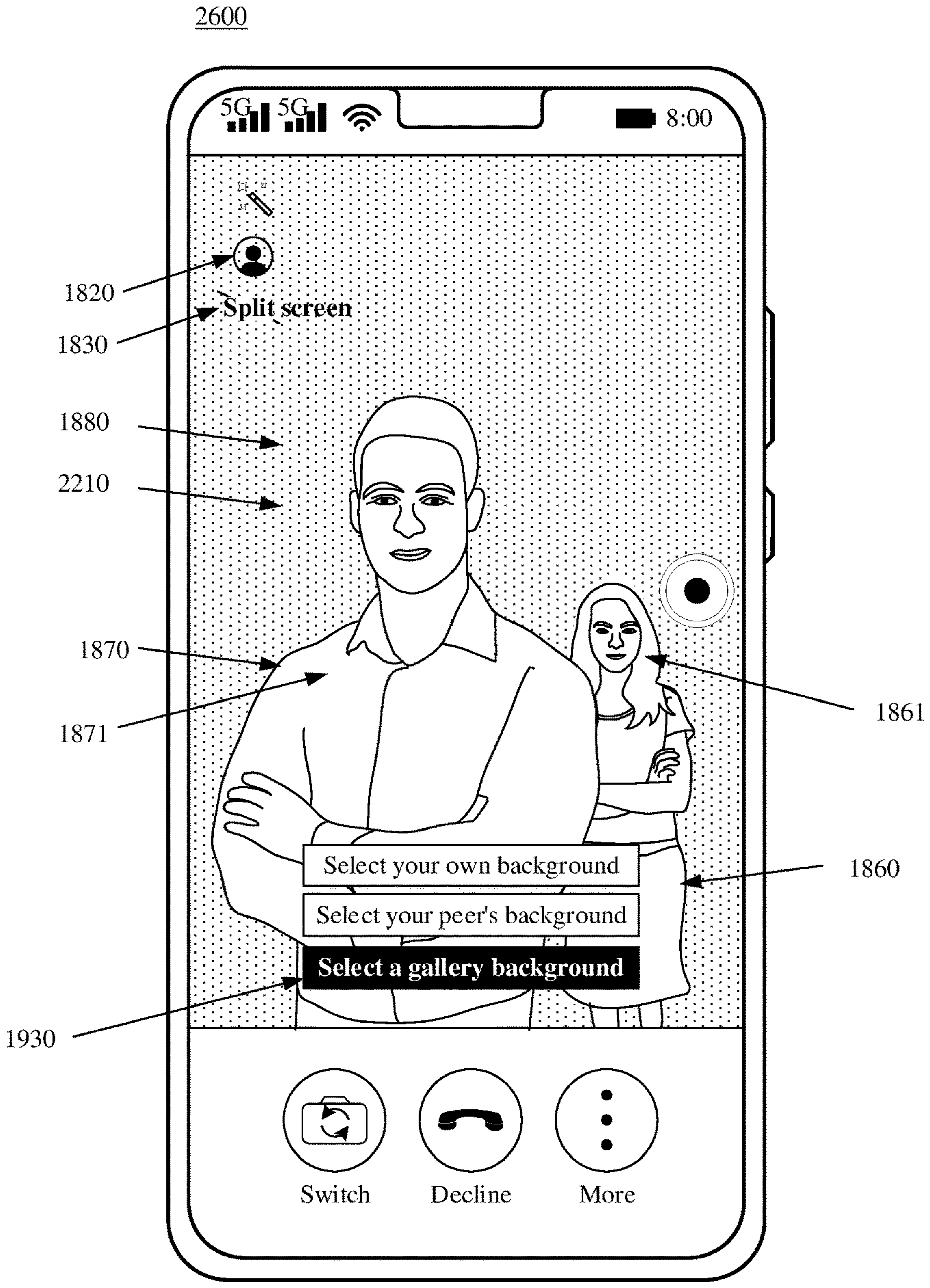
FIG. 27 is a schematic diagram of a structure of a user interface according to an embodiment of this application.

In an example, as shown in FIG. 24 and FIG. 27, the user interface may include a gallery background control 1930.

The gallery background control 1930 indicates the electronic device to obtain the target gallery image 2210 from the gallery. The electronic device may display the target gallery image 2210 in the background interface region 1880 in response to an operation performed by the user on the gallery background control 1930. As shown in FIG. 27, the background interface region 1880 may include pixels corresponding to the target gallery image 2210. The target gallery image 2210 may be a subframe of the video.

Because the synthesized target video may correspond to the user interface displayed by the electronic device, the electronic device may synthesize the first user image 1861 in the first video, the second user image 1871 in the second video, and the second background image 1872 in the second video to obtain the target video, where a first image region of the target video may correspond to the first user image 1861, the second image region of the target video may correspond to the second user image 1871, and the background image region of the target video may correspond to the second background image 1872.

After remote co-photographing is completed, the user interface may display a video call decline control 1850 shown in FIG. 19. The electronic device may decline a video call between the first user and the second user in response to an operation (for example, a tap operation) performed by the user on the video call decline control 1850. In this way, the first user may implement a video call and remote co-photographing with the second user by using a MeeTime application.

The electronic device may invoke a target video in response to an operation performed by the user on a gallery application, so that the user can watch the target video. The electronic device may perform subsequent adjustment on the target video in response to an operation performed by the user on the gallery application, for example, may adjust a speed of the first image region, a playback speed of the second image region, beautification of the first image region, beautification of the second image region, a size of the first image region, and a size of the second image region.

Figure 28:
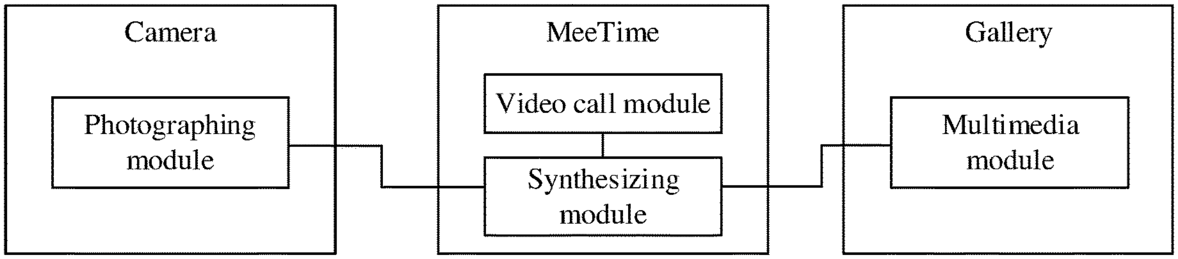
FIG. 28 is a relationship diagram of an application module according to an embodiment of this application.

FIG. 28 is a relationship diagram of an application module according to an embodiment of this application. A camera application shown in FIG. 28 may correspond to, for example, the camera application shown in FIG. 2. A MeeTime application shown in FIG. 28 may correspond to, for example, the MeeTime application shown in FIG. 2. A gallery application shown in FIG. 28 may correspond to, for example, the gallery application shown in FIG. 2.

The camera application may include a photographing module. In an example, the photographing module may be configured to photograph a scene in which a first user is shown, to obtain a first video. In another example, the photographing module may be configured to photograph a scene in which a second user is shown, to obtain a second video.

The MeeTime application may include a video call module. In an example, the video call module may be configured to: send the first video to a second electronic device, and obtain the second video from the second electronic device, where the second electronic device is an electronic device of the second user. In another example, the video calling module may be configured to: send the second video to a first electronic device, and obtain the first video from the first electronic device, where the first electronic device is an electronic device of the first user.

The MeeTime application may further include a synthesizing module. The synthesizing module may obtain a target video through synthesizing based on the first video and the second video.

The gallery application may include a multimedia module. The multimedia module can invoke the target video and perform post-processing on the target video.

According to the solution provided in this embodiment of this application, a video call may be implemented by using the MeeTime application, and photographing may be implemented by invoking the camera application of the electronic device by using the MeeTime application, to implement synchronous remote co-photographing. Because the video call may facilitate discussion and communication between a plurality of users, it is helpful to improve a matching degree of co-photographing of the plurality of users. After the video call is hung up, a co-photographing picture or a co-photographing video with a good co-photographing effect can be obtained, to help reduce a workload of the user in a co-photographing process, for example, a workload of post-retouching. When call quality is good (for example, when a signal of an electronic device is good), definition of the co-photographing image or the co-photographing video may be high.

With reference to the solutions provided in embodiments of this application, a person skilled in the art may further figure out another possible solution. For example, the user may jump to and enter, by using the camera application shown in FIG. 3, the MeeTime application shown in FIG. 15, and complete a video call and remote co-photographing by performing operations in the user interfaces shown in FIG. 15 to FIG. 28. For another example, the user may jump to and enter, by using the MeeTime application shown in FIG. 15, the camera application shown in FIG. 3, and complete a video call and remote co-photographing by performing operations in the user interfaces shown in FIG. 3 to FIG. 13.

The following describes several possible co-photographing scenes with reference to the examples shown in FIG. 3 to FIG. 28.

Scene 1

A user A and a user B are in different places and cannot meet immediately. The user A and the user B plan to shoot a co-photographing video for a physical movement (like a dance, a finger movement, or gymnastics). Requirements of the user A and the user B for the co-photographing video may include, for example, that speeds of body movements are generally the same; when the user A and the user B perform the body movements, the body movements may start or end approximately at the same time; and in terms of a size, a depth of field, or the like, an image of the user A in the co-photographing video may be generally the same as an image of the user B in the co-photographing video.

With reference to the examples shown in FIG. 3 to FIG. 28, the user A may invite, through the electronic device A, the user B to make a video call and perform remote co-photographing. The user B may connect, through the electronic device B, the video call invitation and the remote co-photographing invitation initiated by the user A. Before formal co-photographing, the user A and the user B may discuss co-photographing details through a video call connection.

For example, the user A and the user B may discuss a dance movement.

For another example, the user A and/or the user B may adjust a distance from a camera of the electronic device.

For another example, the user A and/or the user B may adjust display effects/a display effect of the user A and/or the user B in the user interface by using one or more of a beauty on/off control, a filter on/off control, and a beautification on/off control in the user interface.

For another example, the user A and/or the user B may perform an operation on the user interface of the electronic device, to adjust display percentages/a display percentage of the user A and/or the user B in the user interface.

For another example, the user A and the user B may determine, through discussion, whether to enable a split screen on/off control. If the split screen on/off control is on, the user A and the user B may further discuss relative locations of an interface region A in which the user A is located and an interface region B in which the user B is located. For example, the interface region A and the interface region B are respectively disposed at an upper location and a lower location in the user interface, or the interface region A and the interface region B are respectively disposed at a left location and a right location in the user interface. If the split screen on/off control is off, the user A and the user B may further determine, through discussion, that the interface region A can cover the interface region B, or the interface region B can cover the interface region A.

For another example, the user A or the user B may determine, through discussion, whether to enable a background removal on/off control. If the split screen on/off control is on, the user A and the user B may further discuss a specific background source used for co-photographing, for example, a background image corresponding to a scene in which the user A is shown, a background image corresponding to a scene in which the user B is shown, or a gallery image invoked from a gallery application.

Then, the user A may perform an operation on a recording control on the electronic device A, or the user B may perform an operation on a recording control on the electronic device B, to start recording of a co-photographing video. The user A and the user B may complete a body movement in a manner previously determined through discussion. After the movement shooting ends, the user A may perform an operation on the recording control on the electronic device A, or the user B may perform an operation on the recording control on the electronic device B, to end recording of the co-photographing. The electronic device A and/or the electronic device B may store the co-photographing video. The user A and the user B may discuss the co-photographing video through a video call connection, to determine whether a new co-photographing video needs to be taken. If a new co-photographing video needs to be taken, the user A and the user B can take the new co-photographing video in the foregoing manner. If a new co-photographing video does not need to be taken, the user A and the user B can choose to end the video call connection.

Before taking of the co-photographing video starts, the users can discuss co-photographing details through the video call connection. After video co-photographing is completed, the electronic device may obtain the co-photographing video through synthesizing based on data obtained during the video call. This helps improve a matching degree of co-photographing of a plurality of users, and reduces a processing amount of the co-photographing video by the user. In addition, this helps improve definition of the co-photographing video. Therefore, this helps improve user experience of co-photographing of the plurality of user in different places.

Another scene similar to Scene 1 may include, for example, that a user A and a user B take a co-photographing video in a live broadcast process. For example, the user A and the user B may make a video call, and the user A or the user B may live broadcast the video call process. The user A and the user B may discuss details of the co-photographing video during live broadcast (that is, the video call), and complete the co-photographing video by using the method provided in this embodiment of this application.

Another scene similar to Scene 1 may include, for example, that during an epidemic, a user A and a user B cannot meet and prepare for a co-photographing video. The user A and the user B may discuss details of the co-photographing video through a video call, and complete the co-photographing video photographing by using the method provided in this embodiment of this application. As described above, a background image of the co-photographing video may be replaced, so that even if the user A and the user B are in different places, the co-photographing video with a same background can be quickly obtained. Therefore, a viewer of the co-photographing video may consider or approximately consider that the user A and the user B are in a same scene.

Another scene similar to Scene 1 may include, for example, that a user A may be a fitness trainee, a user B may be a fitness coach, and the user A and the user B may improve teaching quality of cloud fitness by taking a co-photographing video. The user A and the user B may discuss a body movement in a co-photographing process through a video call, and complete the co-photographing video by using the method provided in this embodiment of this application. Then, the user B (that is, the fitness coach) may comment on whether a fitness movement of the user A (that is, the fitness trainee) is standard for the co-photographing video.

Scene 2

A user C and a user D are in different places and cannot meet immediately. The user C and the user D prepare to start a video conference and record the video conference by taking a co-photographing video. Requirements of the user C and the user D for the co-photographing video may include, for example, that the user C and the user D may be in a same conference site; and the user C communicates with the user D naturally.

With reference to the examples shown in FIG. 3 to FIG. 28, the user C may invite, through an electronic device C, the user D to make a video call and perform remote co-photographing. The user D may connect, through an electronic device D, the video call invitation and the remote co-photographing invitation initiated by the user C. Before formal co-photographing, the user C and the user D may discuss co-photographing details through a video call connection.

For example, the user C and the user D may discuss a proper conference background and postures/a posture of the user C and/or the user D. The conference background may be, for example, a background image corresponding to a scene in which the user C is shown, a background image corresponding to a scene in which the user D is shown, or a gallery image invoked from a gallery application.

For another example, the user C and/or the user D may adjust a distance from a camera of the electronic device.

For another example, the user C and/or the user D may adjust display effects/a display effect of the user C and/or the user D in the user interface by using one or more of a beauty on/off control, a filter on/off control, and a beautification on/off control in the user interface.

For another example, the user C and/or the user D may perform an operation on the user interface of the electronic device, to adjust display percentages/a display percentage of the user C and/or the user D in the user interface.

For another example, the user C and the user D may determine, through discussion, whether to enable a split screen on/off control. If the split screen on/off control is on, the user C and the user D may further discuss relative locations of an interface region C in which the user C is located and an interface region D in which the user D is located. For example, the interface region C and the interface region D are respectively disposed at an upper location and a lower location in the user interface, or the interface region C and the interface region D are respectively disposed at a left location and a right location in the user interface. If the split screen on/off control is off, the user C and the user D may further determine, through discussion, that the interface region C can cover the interface region D, or the interface region D can cover the interface region C.

Then, the user C may perform an operation on a recording control on the electronic device C, or the user D may perform an operation on a recording control on the electronic device D, to start recording of a co-photographing video. The user C and the user D may perform conference communication. After the conference ends, the user C may perform an operation on the recording control on the electronic device C, or the user D may perform an operation on the recording control on the electronic device D, to end recording of the co-photographing video. The electronic device C and/or the electronic device D may store the co-photographing video. The co-photographing video may be meeting minutes of a video type. The user C and the user D may discuss the co-photographing video through a video call connection, to determine whether a new round of meeting minutes needs to be recorded. If a new round of meeting minutes needs to be recorded, the user C and the user D can take the new co-photographing video in the foregoing manner. If a new round of meeting minutes does not need to be recorded, the user C and the user D can choose to end the video call connection.

Before taking of the co-photographing video starts, the users can discuss co-photographing details through the video call connection. After video co-photographing is completed, the electronic device may obtain the co-photographing video through synthesizing based on data obtained during the video call. In this way, the remote video conference can be closer to a meeting in a same place. In addition, definition of the co-photographing video can be improved. Therefore, this helps improve user experience of co-photographing of the plurality of user in different places.

Another scene similar to Scene 1 may include, for example, that a user C is a teacher, a user D is a student, the user C may provide an online tutorial, and the user D may obtain knowledge through the online tutorial. According to the co-photographing method provided in this embodiment of this application, a teaching video can be obtained, to help improve teaching quality of the online course. For example, before the co-photographing starts, the user C and the user D may discuss specific details of the co-photographing video through the video call, for example, postures of the user C and the user D. A background image of the co-photographing video may correspond to a classroom scene, and a slide presented by the user C may be displayed on a blackboard, a whiteboard, a projection screen, or the like in the classroom scene. After taking of the co-photographing video starts, the user C and the user D may start teaching and learning, and obtain the co-photographing video by using the method provided in this embodiment of this application. The user C may use the co-photographing video as a teaching video template for subsequent use. The user D may repeatedly watch the co-photographing video to review the knowledge.

Figure 29:
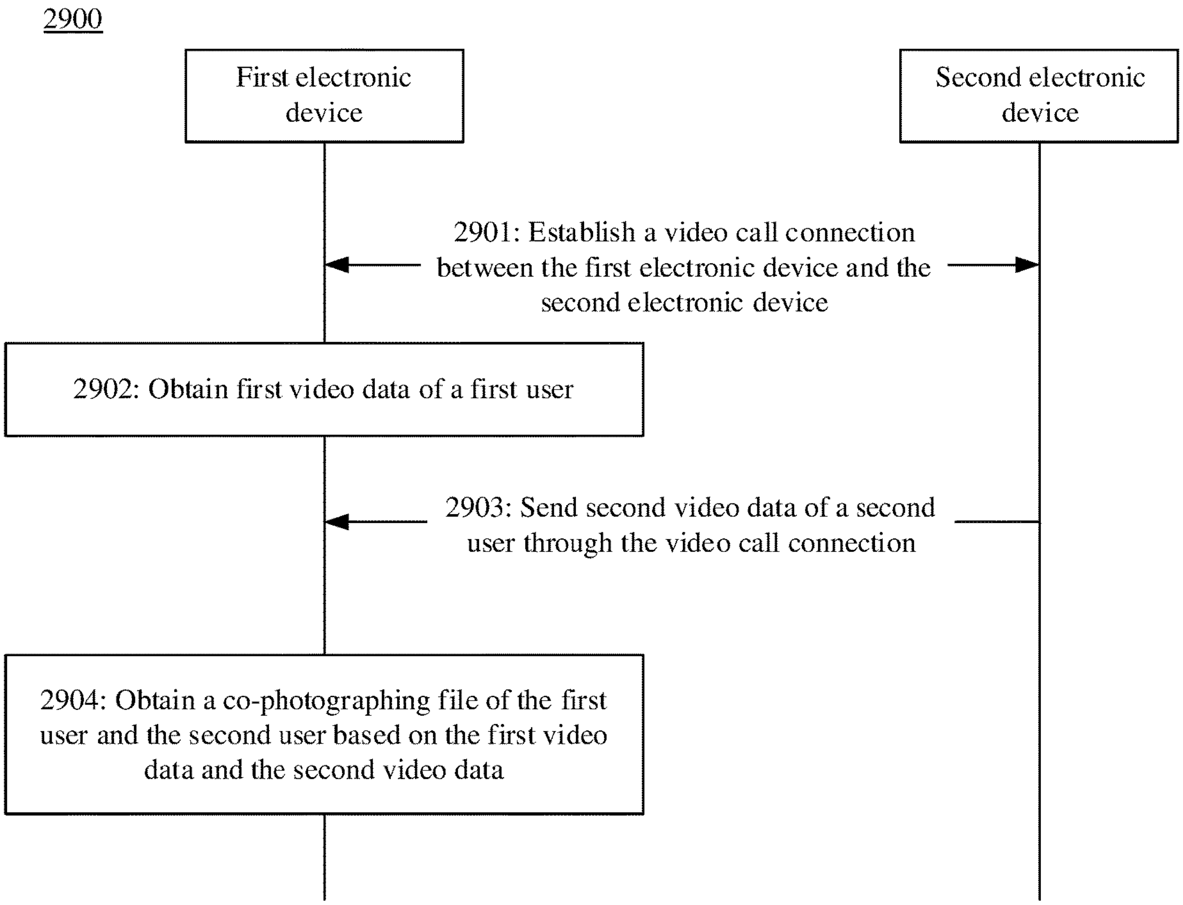
FIG. 29 is a schematic flowchart of a co-photographing method according to an embodiment of this application.

An embodiment of this application further provides a co-photographing method 2900. The method 2900 may be implemented in the electronic device (for example, a mobile phone or a tablet computer) shown in FIG. 1 and FIG. 2. As shown in FIG. 29, the method 2900 may include the following steps.

2901: A first electronic device establishes a video call connection between the first electronic device and a second electronic device, where the first electronic device is an electronic device of a first user, and the second electronic device is an electronic device of a second user.

Correspondingly, the second electronic device establishes a video call connection between the first electronic device and the second electronic device.

For example, as shown in FIG. 3 and FIG. 4, the first electronic device may initiate a video call connection through a photographing application.

For example, as shown in FIG. 15 to FIG. 17, the first electronic device may initiate a video call connection through a video call application.

Optionally, before the first electronic device establishes the video call connection between the first electronic device and the second electronic device, the co-photographing method further includes: The first electronic device displays a first interface of a photographing application, where the first interface includes a co-photographing control. The first electronic device displays a second interface in response to an operation performed on the co-photographing control, where the second interface includes a plurality of user controls that are in a one-to-one correspondence with a plurality of users, and the plurality of users include the second user. The first electronic device sends a co-photographing invitation to the second electronic device in response to an operation performed on a user control of the second user, to establish the video call connection.

For example, the user control of the second user may be the control 410 or the control 411 shown in FIG. 4.

Optionally, before the first electronic device establishes the video call connection between the first electronic device and the second electronic device, the co-photographing method further includes: The first electronic device displays a third interface of a video call application, where the third interface includes a plurality of video call controls that are in a one-to-one correspondence with a plurality of users, and the plurality of users include the second user. The first electronic device sends a video call invitation to the second electronic device in response to an operation performed on a video call control of the second user, to establish the video call connection.

For example, the control of the second user may be the control 1411, the control 1412, the control 1430, or the control 1440 shown in FIG. 15.

2902: The first electronic device obtains first video data of the first user in a video call process.

For example, as shown in FIG. 5 to FIG. 13, the first electronic device may obtain, by using a photographing application, a video of the first user that is shot in a video call process.

For example, as shown in FIG. 18 to FIG. 27, the first electronic device may obtain, by using a video call application, a video of the first user that is shot in a video call process.

2903: The first electronic device obtains second video data of the second user from the second electronic device through the video call connection.

Correspondingly, the second electronic device sends the second video data of the second user to the first electronic device through the video call connection.

For example, as shown in FIG. 5 to FIG. 13, the first electronic device may obtain, from the second electronic device by using a photographing application, a video of the second user that is shot by the second electronic device in the video call process.

For example, as shown in FIG. 18 to FIG. 27, the first electronic device may obtain, from the second electronic device by using a video call application, a video of the second user that is shot by the second electronic device in the video call process.

2904: The first electronic device obtains a co-photographing file of the first user and the second user based on the first video data and the second video data.

For example, as shown in FIG. 5 to FIG. 13, the first electronic device may synthesize the videos of the two users in the video call process by using a photographing application.

For example, as shown in FIG. 18 to FIG. 27, the first electronic device may synthesize the videos of the two users in the video call process by using a video call application.

Optionally, the co-photographing method further includes: The first electronic device displays a first interface region and a second interface region in a fourth interface based on the first video data and the second video data, where the first interface region includes a first user image, the second interface region includes a second user image, the first user image includes pixels corresponding to the first user, and the second user image includes pixels corresponding to the second user.

Before formal co-photographing, the first electronic device may display the fourth interface. For example, the fourth interface may be the interface shown in FIG. 5 to FIG. 13 or the interface shown in FIG. 18 to FIG. 27.

Optionally, the fourth interface includes a split screen on/off control and a background removal on/off control, and when the split screen on/off control is on and the background removal on/off control is on, the first interface region further includes a second background image or a target gallery image, and/or the second interface region further includes a first background image or a target gallery image, where the first background image includes pixels corresponding to a scene in which the first user is shown, and the second background image includes pixels corresponding to a scene in which the second user is shown.

For example, the second interface region further includes a first background image, and the fourth interface may be, for example, the interface shown in FIG. 7.

For example, the first interface region further includes a second background image, and the fourth interface may be, for example, the interface shown in FIG. 8.

For example, the first interface region further includes a target gallery image, the second interface region further includes a target gallery image, and the fourth interface may be, for example, the interface shown in FIG. 9.

Optionally, the fourth interface includes a split screen on/off control and a background removal on/off control, and when the split screen on/off control is off and the background removal on/off control is on, the fourth interface includes a background interface region, the background interface region is backgrounds of the first interface region and the second interface region, and the background interface region includes any one of the following: a first background image, a second background image, and a target gallery image, where the first background image includes pixels corresponding to a scene in which the first user is shown, and the second background image includes pixels corresponding to a scene in which the second user is shown.

For example, the background interface region includes a first background image, and the fourth interface may be, for example, the interface shown in FIG. 11.

For example, the background interface region includes a second background image, and the fourth interface may be, for example, the interface shown in FIG. 12.

For example, the background interface region includes a first background image, and the fourth interface may be, for example, the interface shown in FIG. 13.

Optionally, the co-photographing method further includes: The first electronic device adjusts a size of the first interface region and/or a size of the second interface region in response to an operation performed on the fourth interface.

Optionally, the co-photographing method further includes: The first electronic device adjusts a display priority of the first interface region or the second interface region in response to an operation performed on the fourth interface.

For example, as shown in 1040 in FIG. 10 and FIG. 11 to FIG. 13, a priority of the second interface region may be higher than a priority of the first interface region, and the first interface region may be covered with the second interface region.

Optionally, the fourth interface further includes a recording control, and the obtaining a co-photographing file of the first user and the second user based on the first video data and the second video data includes: The first electronic device obtains the co-photographing file based on the first video data and the second video data in response to an operation performed on the recording control.

For example, as shown in 510 in FIG. 5, the first electronic device may perform an operation on a recording control in a photographing application.

For example, as shown in 1810 in FIG. 19, the first electronic device may perform an operation on a recording control in a video call application.

Optionally, the co-photographing file includes a first image region and a second image region, the first image region includes pixels corresponding to the first user, and the second image region includes pixels corresponding to the second user.

Optionally, the first image region includes pixels corresponding to any one of a first background image, a second background image, and a target gallery image.

Optionally, the second image region includes pixels corresponding to any one of the first background image, the second background image, and the target gallery image.

Optionally, the co-photographing file further includes a background image region, the background image region is backgrounds of the first image region and the second image region, and the background image region includes pixels corresponding to any one of the first background image, the second background image, and the target gallery image.

For an example of the co-photographing file, refer to an example of the fourth interface. Details are not described herein again.

Optionally, resolution of the co-photographing file is higher than display resolution of the first electronic device.

Optionally, the co-photographing file is a co-photographing image or a co-photographing video.

It may be understood that, to implement the foregoing functions, the electronic device includes corresponding hardware and/or software modules for performing the functions. In combination with example algorithm steps described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In embodiments, the electronic device may be divided into functional modules based on the foregoing method examples. For example, each functional module corresponding to each function may be obtained through division, or two or more functions may be integrated into one processing module. The integrated module may be implemented by form of hardware. It should be noted that division into the modules in this embodiment is an example and is merely logical function division, and may be other division in an actual implementation.

Figure 30:
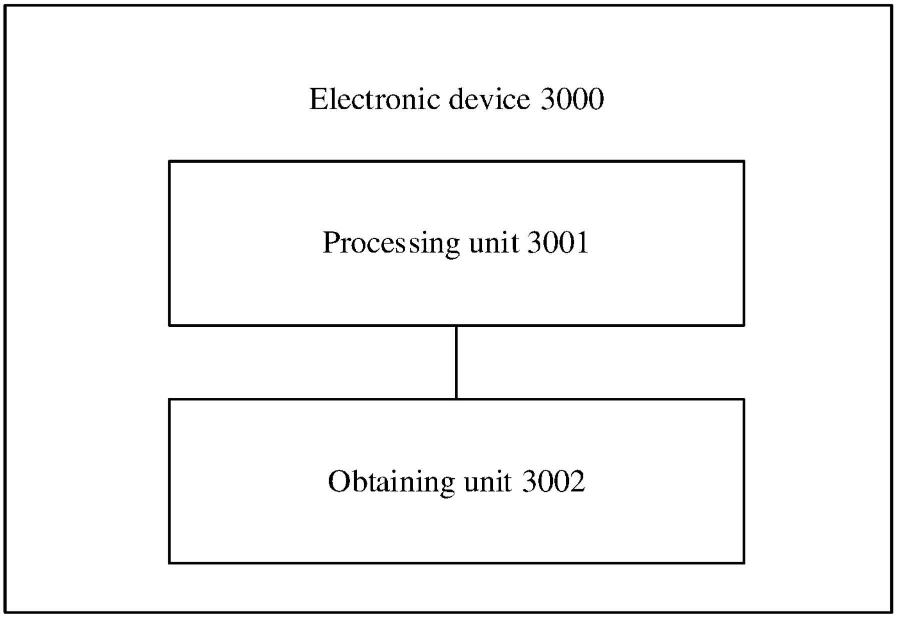
FIG. 30 is a schematic diagram of a structure of an electronic device according to an embodiment of this application.

When the functional modules corresponding to the functions are obtained through division, FIG. 30 is a possible schematic composition diagram of an electronic device 3000 in the foregoing embodiment. As shown in FIG. 30, the electronic device 3000 may include a processing unit 3001 and an obtaining unit 3002.

The processing unit 3001 may be configured to establish a video call connection between the electronic device 3000 and a second electronic device.

The processing unit 3001 may be further configured to obtain first video data of a first user in a video call process.

The obtaining unit 3002 may obtain second video data of a second user from the second electronic device through the video call connection.

The processing unit 3001 may be further configured to obtain a co-photographing file of the first user and the second user based on the first video data and the second video data.

It should be noted that all related content of the steps in the foregoing method embodiments may be cited in function description of corresponding functional modules. Details are not described herein again.

When an integrated unit is used, the electronic device may include a processing module, a storage module, and a communication module. The processing module may be configured to: control and manage actions of the electronic device, for example, may be configured to support the electronic device in performing the steps performed by the foregoing units. The storage module may be configured to support the electronic device in storing program code, data, and the like. The communication module may be configured to support communication between the electronic device and another device.

The processing module may be a processor or a controller. The processor may implement or perform various examples of logic blocks, modules, and circuits described with reference to content disclosed in this application. Alternatively, the processor may be a combination of processors implementing a computing function, for example, a combination of one or more microprocessors, a combination of a digital signal processor (digital signal processor, DSP) and a microprocessor, or the like. The storage module may be a memory. The communication module may be a transceiver. The communication module may be specifically a device, for example, a radio frequency circuit, a Bluetooth chip, a Wi-Fi chip, or the like that interacts with another electronic device.

In an embodiment, when the processing module is a processor and the storage module is a memory, the electronic device in this embodiment may be a device with the structure shown in FIG. 1.

An embodiment further provides a computer storage medium. The computer storage medium stores computer instructions. When the computer instructions are run on an electronic device, the electronic device is enabled to perform the related method steps, to implement the co-photographing method in the foregoing embodiments.

An embodiment further provides a computer program product. When the computer program product runs on a computer, the computer is enabled to perform the related steps, to implement the co-photographing method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to enable the chip to perform the co-photographing method in the foregoing method embodiments.

The electronic device, the computer storage medium, the computer program product, or the chip provided in embodiments is configured to perform the corresponding method provided above. Therefore, for beneficial effects that can be achieved by the electronic device, the computer storage medium, the computer program product, or the chip, refer to the beneficial effects of the corresponding method provided above. Details are not described herein again.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the foregoing apparatus embodiments are merely examples. For example, division into the units is merely logical function division and may be other division in an actual implementation. For example, a plurality of units or components may be combined or integrated into another system, or some features may be ignored or not performed.

In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions in embodiments.

In addition, functional units in embodiments of this application may be integrated into one processing unit, or each of the units may exist alone physically, or two or more units may be integrated into one unit.

When the functions are implemented by form of a software functional unit and sold or used as an independent product, the functions may be stored in a computer-readable storage medium. Based on such an understanding, the technical solutions of this application essentially, or the part contributing to the conventional technology, or some of the technical solutions may be implemented by form of a software product. The computer software product is stored in a storage medium, and includes several instructions for instructing a computer device (which may be a personal computer, a server, a network device, or the like) to perform all or some of the steps of the methods in embodiments of this application. The foregoing storage medium includes any medium that can store program code, like a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A co-photographing method, comprising:
- establishing, by a first electronic device, a video call connection between the first electronic device and a second electronic device;
- obtaining, by the first electronic device, first video data associated with the first electronic device in a video call process;
- obtaining, by the first electronic device, second video data associated with the second electronic device through the video call connection;
- obtaining, by the first electronic device, a co-photographing file based on the first video data and the second video data;
- displaying, by the first electronic device in a fourth interface, a first interface region and a second interface region based on the first video data and the second video data, wherein:
  - the first interface region comprises a first image associated with the first video data;
  - the second interface region comprises a second image associated with the second video data;
  - the first image comprises pixels associated with the first video data;
  - the second image comprises pixels associated with the second video data;
  - the fourth interface comprises a split screen on/off control and a background removal on/off control, and when the split screen on/off control is “off” and the background removal on/off control is “on”, the fourth interface comprises a background interface region including backgrounds of the first interface region and the second interface region, and the background interface region comprises a first background image including pixels corresponding to a scene associated with the first video data or a second background image including pixels corresponding to a scene associated with the second video data; and
- adjusting, by the first electronic device, a display priority of the first interface region or the second interface region in response to an operation performed on the fourth interface.

2. The co-photographing method according to claim 1, comprising:
- displaying, by the first electronic device, a first interface of a photographing application, wherein the first interface comprises a co-photographing control;
- displaying, by the first electronic device, a second interface in response to an operation performed on the co-photographing control, wherein the second interface comprises a plurality of user controls that are provided in a one-to-one correspondence with a plurality of electronic devices participating in the video call, the plurality of electronic devices including the second electronic device; and
- sending, by the first electronic device, a co-photographing invitation to the second electronic device in response to an operation performed on a user control associated with the second electronic device to establish the video call connection.

3. The co-photographing method according to claim 1, wherein before the establishing, by a first electronic device, a video call connection between the first electronic device and a second electronic device, the co-photographing method further comprises:
- displaying, by the first electronic device, a third interface of a video call application, wherein the third interface comprises a plurality of video call controls that are provided in a one-to-one correspondence with a plurality of electronic devices participating in the video call, the plurality of electronic devices including the second electronic device; and
- sending, by the first electronic device, a video call invitation to the second electronic device in response to an operation performed on a video call control associated with the second electronic device to establish the video call connection.

4. The co-photographing method according to claim 1, wherein when the split screen on/off control is “on” and the background removal on/off control is “on”, at least one of the following conditions exists:
- the first interface region further comprises a second background image or a target gallery image; or
- the second interface region further comprises a first background image or a target gallery image, the first background image comprising pixels corresponding to a scene associated with the first video data, and the second background image comprises pixels corresponding to a second scene associated with the second video data.

5. The co-photographing method according to claim 1, wherein the co-photographing method further comprises:

adjusting, by the first electronic device, at least one of a size of the first interface region or a size of the second interface region in response to an operation performed on the fourth interface.

6. The co-photographing method according to claim 1, wherein the fourth interface further comprises a recording control, and the obtaining a co-photographing file associated with each of the first video data and the second video data comprises:

obtaining, by the first electronic device, the co-photographing file based on the first video data and the second video data in response to an operation performed on the recording control.

7. The co-photographing method according to claim 6, wherein the co-photographing file comprises a first image region and a second image region, the first image region comprises the pixels associated with the first video data, and the second image region comprises the pixels associated with the second video data.

8. The co-photographing method according to claim 6, wherein the co-photographing file comprises a first image region and a second image region, the first image region comprises the pixels corresponding to any one of the first background image, the second background image or the target gallery image; and the second image region comprises the pixels corresponding to any one of the first background image, the second background image or a target gallery image.

9. The co-photographing method according to claim 7, wherein the co- photographing file further comprises a background image region including backgrounds of the first image region and the second image region, and the background image region comprises pixels corresponding to any one of the first background image, the second background image, and a target gallery image.

10. The co-photographing method according to claim 1, wherein resolution of the co-photographing file is higher than display resolution of the first electronic device.

11. The co-photographing method according to claim 1, wherein the co-photographing file is a co-photographing image or a co-photographing video.

12. An electronic device, comprising:

a processor;

a memory connected to the processor and storing a computer program including instructions that, when executed by the processor, cause the electronic device to:

establish a video call connection between the electronic device and a second electronic device;

obtain first video data associated with the electronic device in a video call process;

obtain second video data of the second electronic device from the second electronic device through the video call connection;

obtain a co-photographing file based on the first video data associated with the first electronic device and the second video data associated with the second electronic device;

display, in a fourth interface, a first interface region and a second interface region based on the first video data and the second video data, wherein:

the first interface region comprises a first image associated with the first video data;

the second interface region comprises a second image associated with the second video data;

the first image comprises pixels associated with the first video data; and the second image comprises pixels associated with the second video data;

the fourth interface comprises a split screen on/off control and a background removal on/off control, and when the split screen on/off control is "off" and the background removal on/off control is "on", the fourth interface comprises a background interface region including backgrounds of the first interface region and the second interface region, and the background interface region comprises a first background image including pixels corresponding to a scene associated with the first video data or a second background image including pixels corresponding to a scene associated with the second video data; and adjusting, by the first electronic device, a display priority of the first interface region or the second interface region in response to an operation performed on the fourth interface.

13. The electronic device according to claim 12, wherein execution of the program instructions by the processor further causes the electronic device to:

display a first interface of a photographing application, wherein the first interface comprises a co-photographing control;

display a second interface in response to an operation performed on the co-photographing control, wherein the second interface comprises a plurality of user controls that are provided in a one-to-one correspondence with a plurality of electronic devices, the plurality of electronic devices comprising the second electronic device; and send a co-photographing invitation to the second electronic device in response to an operation performed on a user control associated with the second electronic device to establish the video call connection.

14. The electronic device according to claim 12, wherein execution of the program instructions by the processor further causes the electronic device to:

display a third interface of a video call application, wherein the third interface comprises a plurality of video call controls that are provided in a one-to-one correspondence with a plurality of electronic devices, the plurality of electronic devices comprising the second electronic device; and send a video call invitation to the second electronic device in response to an operation performed on a video call control associated with the second electronic device to establish the video call connection.

15. The electronic device according to claim 12, wherein when the split screen on/off control is "on" and the background removal on/off control is "on", at least one of the following conditions exists:

the first interface region further comprises a second background image; or the second interface region further comprises a first background image, wherein the first background image comprises pixels corresponding to a scene associated with the first video data, and the second background image comprises pixels corresponding to a second scene associated with the second video data.

16. A non-transitory computer storage medium comprising computer instructions that, when the computer instructions are run on an electronic device, the electronic device is enabled to perform operations including:

establishing a video call connection between the electronic device and a second electronic device;

obtaining first video data associated with the electronic device in a video call process;

obtaining second video data associated with the second electronic device from the second electronic device through the video call connection;

obtaining a co-photographing file associated with the first electronic device and the second electronic device based on the first video data and the second video data; displaying, in a fourth interface, a first interface region and a second interface region based on the first video data and the second video data, wherein:

the first interface region comprises a first image associated with the first video data;

the second interface region comprises a second image associated with the second video data;

the first image comprises pixels associated with the first video data; and the second image comprises pixels associated with the second video data;

the fourth interface comprises a split screen on/off control and a background removal on/off control, and when the split screen on/off control is "off" and the background removal on/off control is "on", the fourth interface comprises a background interface region including backgrounds of the first interface region and the second interface region, and the background interface region comprises a first background image including pixels corresponding to a scene associated with the first video data or a second background image including pixels corresponding to a scene associated with the second video data; and adjusting, by the first electronic device, a display priority of the first interface region or the second interface region in response to an operation performed on the fourth interface.

* * * * *